US011436926B2

(12) United States Patent
Gao et al.

(10) Patent No.: US 11,436,926 B2
(45) Date of Patent: Sep. 6, 2022

(54) MULTI-AUTONOMOUS VEHICLE SERVICING AND CONTROL SYSTEM AND METHODS

(71) Applicant: Uber Technologies, Inc., San Francisco, CA (US)

(72) Inventors: Shenglong Gao, San Francisco, CA (US); Leigh Gray Hagestad, San Francisco, CA (US); Jay A. Chen, Fremont, CA (US); Mark Yen, San Francisco, CA (US); Brent Justin Goldman, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 322 days.

(21) Appl. No.: 16/720,168

(22) Filed: Dec. 19, 2019

(65) Prior Publication Data

US 2021/0104160 A1 Apr. 8, 2021

Related U.S. Application Data

(60) Provisional application No. 62/912,185, filed on Oct. 8, 2019.

(51) Int. Cl.
*G08G 1/00* (2006.01)
*G01C 21/34* (2006.01)
*G05D 1/02* (2020.01)
*G06Q 10/02* (2012.01)

(52) U.S. Cl.
CPC ........... *G08G 1/202* (2013.01); *G01C 21/343* (2013.01); *G05D 1/0217* (2013.01); *G06Q 10/02* (2013.01)

(58) Field of Classification Search
CPC ...... G08G 1/202; G08G 1/207; G01C 21/343; G01C 21/3438; G05D 1/0217; G06Q 10/02
See application file for complete search history.

(56) References Cited

U.S. PATENT DOCUMENTS

| 10,563,996 | B2* | 2/2020 | Marueli | G01C 21/3484 |
|---|---|---|---|---|
| 10,895,463 | B1* | 1/2021 | Cope | G01C 21/3484 |
| 2015/0379468 | A1 | 12/2015 | Harvey | |
| 2017/0132934 | A1* | 5/2017 | Kentley | G08G 1/202 |

(Continued)

*Primary Examiner* — Peter D Nolan
*Assistant Examiner* — Peter Y Ning
(74) *Attorney, Agent, or Firm* — Schwegman Lundberg & Woessner, P.A.

(57) ABSTRACT

Systems and methods for multi-autonomous vehicle servicing and control are provided. A method can include receiving a service request for a vehicle service. The method can include determining a vehicle route from the start location to the end location. The method can include identifying a plurality of candidate vehicles from a plurality of autonomous vehicles. The method can include obtaining data indicative of one or more operational capabilities for each candidate vehicle in the plurality of autonomous vehicles. The method can include segmenting the vehicle route into one or more route segments based on the one or more operational capabilities associated with each autonomous vehicle in the plurality of autonomous vehicles. The method can include assigning at least two candidate vehicles to perform the vehicle service by assigning at least one of the one or more route segments to each of the at least two candidate vehicle.

19 Claims, 11 Drawing Sheets

(56) References Cited

U.S. PATENT DOCUMENTS

| | | | |
|---|---|---|---|
| 2019/0086914 A1* | 3/2019 | Yen | G05D 1/0027 |
| 2019/0228375 A1* | 7/2019 | Laury | G05D 1/0088 |
| 2019/0311307 A1* | 10/2019 | Ramot | G01C 21/3438 |
| 2019/0383623 A1* | 12/2019 | Aich | G06Q 10/047 |
| 2020/0042019 A1* | 2/2020 | Marczuk | G08G 1/205 |
| 2020/0104962 A1* | 4/2020 | Aich | G06Q 10/06315 |
| 2021/0080269 A1* | 3/2021 | Sharma | G06Q 50/30 |
| 2021/0102815 A1* | 4/2021 | Spielman | G01C 21/3423 |
| 2021/0142248 A1* | 5/2021 | Balva | G06Q 10/06315 |

* cited by examiner

300

| User Transportation Service Request | | — 305 |
|---|---|---|
| Request Identifier | X999999 | |
| Start Location | Point A | |
| End location | Point B | |
| User Preferences | x.xxx | |
| Route | x.xxx | |
| Projected Time | x.xxx | |
| Projected Traffic | x.xxx | |
| Projected Service Price | x.xxx | |
| Projected Incentives | x.xxx | |

310 — Request Identifier
315 — Start Location
320 — End location
325 — User Preferences
330 — Route
335A — Projected Time
335B — Projected Traffic
335C — Projected Service Price
335D — Projected Incentives

*FIG. 3*

MULTI-AUTONOMOUS VEHICLE SERVICING AND CONTROL SYSTEM AND METHODS

RELATED APPLICATION

The present application is based on and claims benefit of U.S. Provisional Patent Application No. 62/912,185 having a filing date of Oct. 8, 2019, which is incorporated by reference herein.

FIELD

The present disclosure relates generally to autonomous vehicle servicing and control. In particular, autonomous vehicles can be controlled to facilitate vehicle services. In some instances, multiple autonomous vehicles can be controlled to facilitate a single vehicle service.

BACKGROUND

An autonomous vehicle can be capable of sensing its environment and navigating with little to no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can navigate through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method for multi-autonomous vehicle servicing. The method includes receiving, by a computing system including one or more computing devices, a service request for a vehicle service. The service request includes a start location and an end location. The method includes determining, by the computing system, a vehicle route from the start location to the end location. The method includes identifying, by the computing system, a plurality of candidate vehicles from a plurality of autonomous vehicles. Each candidate vehicle in the plurality of candidate vehicles is available to perform at least one portion of the vehicle route. The method includes obtaining, by the computing system, data indicative of one or more operational capabilities for each candidate vehicle in the plurality of autonomous vehicles. The method includes segmenting, by the computing system, the vehicle route into one or more route segments based, at least in part, on the one or more operational capabilities associated with each autonomous vehicle in the plurality of autonomous vehicles. The method includes assigning, by the computing system, at least two candidate vehicles to perform the vehicle service by assigning at least one of the one or more route segments to each of the at least two candidate vehicles. And, the method includes communicating, by the computing system, data indicative of the service request to the at least two candidate vehicles.

Another example aspect of the present disclosure is directed to a computer-implemented method for multi-autonomous vehicle servicing. The method includes receiving, by a computing system including one or more computing devices, a service request for a vehicle service. The service request includes a start location and an end location. The method includes determining, by the computing system, a vehicle route from the start location to the end location. The method includes determining, by the computing system, a plurality of candidate vehicles from a plurality of vehicles, wherein each candidate vehicle in the plurality of candidate vehicles is available to perform at least one portion of the vehicle route. The method includes segmenting, by the computing system, the vehicle route into one or more route segments based, at least in part, on one or more operational capabilities associated with each vehicle in the plurality of vehicles. The method includes assigning, by the computing system, at least two candidate vehicles to perform the vehicle service by assigning at least one of the one or more route segments to each of the at least two candidate vehicles. And, the method includes communicating, by the computing system, data indicative of the service request to the at least two candidate vehicles.

Yet another example aspect of the present disclosure is directed to an autonomous vehicle. The autonomous vehicle includes one or more processors and one or more tangible, non-transitory, computer readable media that collectively store instructions that when executed by the one or more processors cause the one or more processors to perform operations. The operations include receiving a service request for a vehicle service. The service request includes a start location and an end location. The operations also include determining vehicle route from the start location to the end location. In addition, the operation includes identifying a plurality of candidate vehicles from a plurality of autonomous vehicles. Each candidate vehicle in the plurality of candidate vehicles is available to perform at least one portion of the vehicle route. The operations include segmenting the vehicle route into one or more route segments based, at least in part, on one or more operational capabilities associated with each autonomous vehicle in the plurality of autonomous vehicles. The operations include assigning at least two candidate vehicles to perform the vehicle service by assigning at least one of the one or more route segments to each of the at least two candidate vehicles. And, the operations include communicating data indicative of the service request to the at least two candidate vehicles.

Other example aspects of the present disclosure are directed to systems, methods, vehicles, apparatuses, tangible, non-transitory computer-readable media, and memory devices for controlling autonomous vehicles.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims.

The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 3 depicts an example service request according to example embodiments of the present disclosure;

DETAILED DESCRIPTION

Figure 1:
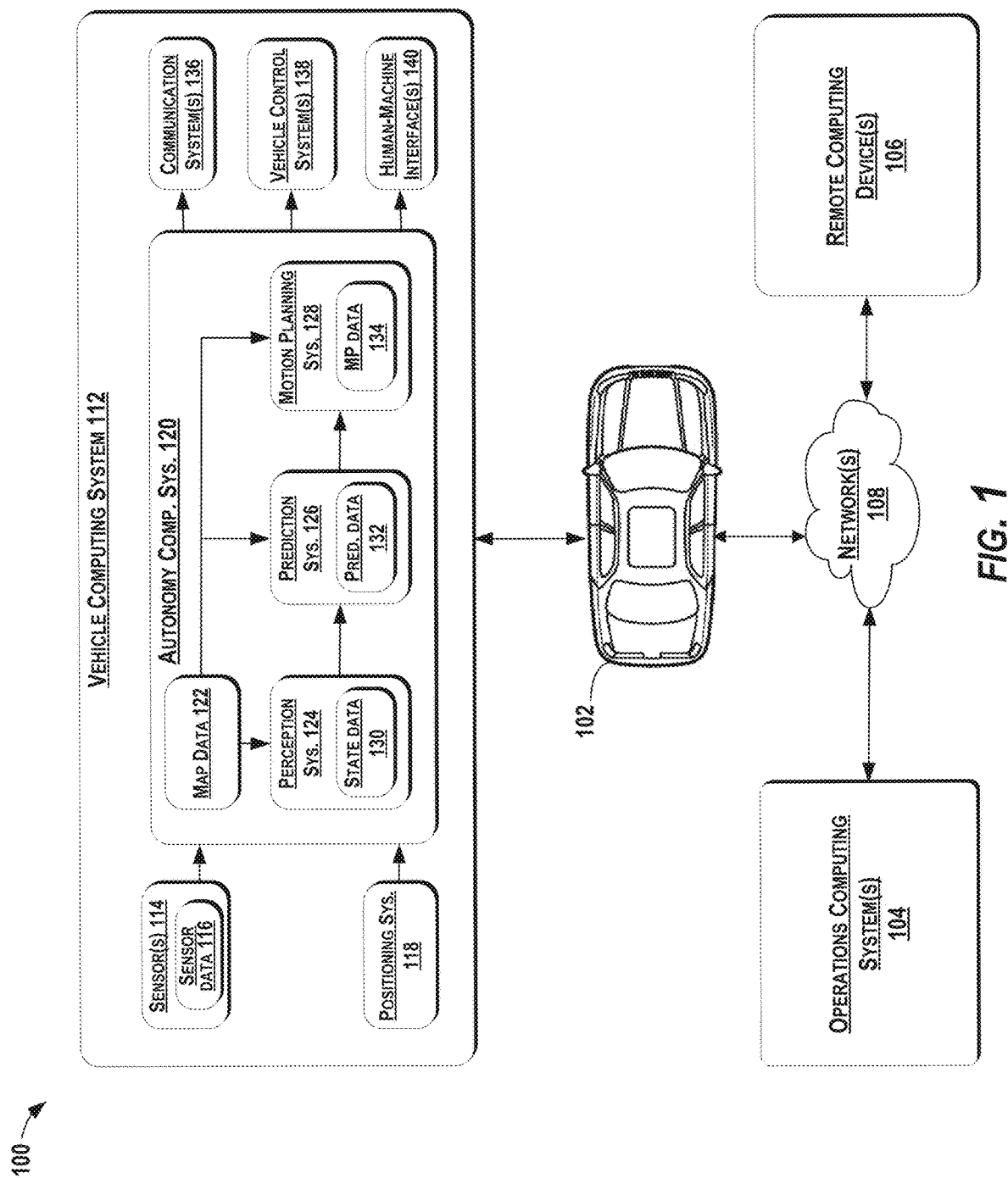
FIG. 1 depicts a block diagram of an example system for controlling the navigation of an autonomous vehicle according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to improved autonomous vehicle control and allocation for the provision of a vehicle service in a manner that most efficiently utilizes the specific autonomy capabilities of each autonomous vehicle. In particular, the systems and methods of the present disclosure provide for segmenting and assigning a vehicle route based on operational capabilities associated with a plurality of vehicles of a transportation service. By way of example, a service entity (e.g., that operates, maintains, manages, etc. a vehicle service platform that coordinates the provision of vehicle services) can receive one or more service requests. Each service request can be associated with a vehicle service for a user (e.g., a service to transport the user from an origin to a destination). The service entity can determine which vehicles are available to the requested service. The service entity can determine a route from the user's origin to a requested destination for the vehicles to follow in order to transport the user from the user's origin to the destination. However, certain vehicles may only be capable of completing a portion of the route.

To address this, the service entity can dissect the route into route segments so that the route can be serviced by two or more vehicles, each capable of completing a portion of the route. The service entity can assign a number of vehicles to provide the vehicle service to the user based on one or more vehicle factors (e.g., operational capabilities, location, driver characteristics, fuel level, etc.). In some implementations, the service entity can also, or alternatively, consider one or more user convenience factors (e.g., time, number of transfer locations, service price, etc.). In addition, the service entity can determine one or more transfer locations based at least in part on the number of vehicles and one or more locations associated with the service request. The transfer locations can be areas where a user can transfer from one vehicle to another. The service entity can determine a route from a start location to an end location that includes the one or more transfer location(s) such that the route is divided into segments in accordance with the transfer locations. The service entity can select a vehicle to service each route segment based at least in part on the vehicle's autonomous operational capabilities (e.g., ability to turn left, U-turn etc.), so that each vehicle can reliably complete its portion of the route and allow the user to switch vehicles at a transfer location. In this manner, the technology of the present disclosure expands the service entity's ability to provide vehicle services to users, while also improving the efficiency of the vehicles' autonomous route navigation so that an autonomous vehicle can navigate without wasting the vehicle's onboard resources (e.g., energy, processing, memory, etc.) on maneuvers that the vehicle may have difficulty completing.

An autonomous vehicle (e.g., ground-based vehicle, bikes, scooters, and other light electric vehicles, etc.) can include various systems and devices configured to control the operation of the vehicle. For example, an autonomous vehicle can include an onboard vehicle computing system (e.g., located on or within the autonomous vehicle) that is configured to operate the autonomous vehicle. Generally, the vehicle computing system can obtain sensor data from a sensor system onboard the vehicle, attempt to comprehend the vehicle's surrounding environment by performing various processing techniques on the sensor data, and generate an appropriate motion plan through the vehicle's surrounding environment. Additionally, the vehicle computing system can communicate with a remote computing system such as, for example, an operations computing system and/or a one or more remote devices via a communication system onboard the vehicle. The operations computing system can be associated with a service entity that provides one or more vehicle services.

As described in greater detail herein, in some implementations, the operations computing system can include various sub-systems/back-ends that are configured to perform various functions. For example, the operations computing system (e.g., a matching/deployment system back-end) can be configured to receive a service request for a vehicle service. The operations computing system (e.g., a routing system back-end) can be configured to determine a vehicle route based on the service request. In addition, the operations computing system (e.g., the matching/deployment system back-end) can be configured to identify a plurality of candidate vehicles available to perform at least a portion of the vehicle route. As further described herein, the operations computing system can be configured to segment the vehicle route based on one or more operational capabilities associated with each candidate vehicle and assign at least one candidate vehicle to service each route segment of the vehicle route. The operations computing system can communicate data indicative of the service request for the candidate vehicles (e.g., directly and/or indirectly to the vehicles, etc.). In this manner, the operations computing system can be configured to facilitate a transportation service utilizing multiple vehicles, where appropriate.

More particularly, the operations computing system can receive a service request for a vehicle service. The vehicle service can be associated with a user. For example, the operations computing system (e.g., the matching/deployment system back-end) can receive a service request for a vehicle service from a user of a service entity. In some implementations, the operations computing system can receive the service request from the user via a user device. In some implementations, the operations computing system can receive data indicative of the service request from another system (e.g., associated with the service entity, associated with a third party, etc.). The service request can include data indicative of a start location and an end location. For example, the service request can be associated with a transportation service for a user from the start location (e.g., a requested origin, etc.) to the end location (e.g., a requested destination, etc.). In such a case, the service request can include one or more user preferences (e.g., number of vehicles, price, time, etc.). In addition, or alternatively, the service request can be associated with a transportation service for one or more items (e.g., items/products for personal delivery, bulk items for business, freight transportation, baggage, other payloads, etc.) from the start location to the end location.

The operations computing system (e.g., the routing system back-end) can determine a vehicle route from the start location to the end location. For instance, the operations computing system can access map data indicative of the start location and the end location. The operations computing system can determine the vehicle route based at least in part on the map data. For example, the vehicle route can include one or more directions based at least in part on the map data. The directions, for example, can include one or more vehicle maneuvers (e.g., driving maneuvers, etc.) and/or geographic areas necessary to transport the user and/or items from the start location to the end location.

The operations computing system can determine how many vehicles may need to be utilized for servicing the service request. This can include vehicles that are online with the service and available to perform a vehicle service, as further described herein. In some implementations, the vehicles can include human-driven vehicles. In some implementations, the vehicles can include autonomous vehicles of the service entity ("first party autonomous vehicles" or "service entity autonomous vehicles"). In some implementations, the vehicles can be autonomous vehicles of a vehicle provider ("third party autonomous vehicles"). A vehicle provider can be, for example, a third party vehicle vendor, operator, manager, etc. that owns, operates, manages, etc. a fleet of third party autonomous vehicles. The vehicle provider can make its fleet (or a portion of its fleet) of third party autonomous vehicles available to the service entity such that the third party autonomous vehicles are available for performing vehicle services (e.g., to address a service request). Each of the one or more vehicle providers can be associated with one or more fleets of vehicles. Thus, each respective vehicle in the plurality of vehicles can be associated with at least one of the one or more fleets of vehicles associated with the one or more vehicle providers.

Each vehicle can be associated with a particular fleet of vehicles based on one or more shared attributes such as, for example, a manufacturer of the vehicle (e.g., make, model, etc.), a type of the vehicle (non-autonomous, autonomous, etc.), a vehicle provider, and/or other factors sufficient to separate the plurality of vehicles. For example, in some implementations, each fleet of vehicles can be associated with one or more operational capabilities. For example, each of the one or more fleets of vehicles can be associated with a set of operational capabilities. In some implementations, the operational capabilities of each vehicle in a respective fleet of vehicles can correspond to the set of operational capabilities associated with the respective fleet of vehicles. As further described herein, the operational capabilities of a vehicle and/or a fleet can indicate the capabilities (e.g., autonomy capabilities, etc.) the vehicle/fleet is able to perform, the capabilities the vehicle/fleet are unable to perform, areas in which the vehicle/fleet are able and/or permitted to operate, areas in which the vehicle/fleet are unable and/or restricted from operating, etc.

The operations computing system can determine a number of the plurality of vehicles for the service request by identifying a plurality of candidate vehicles available to complete the service. For example, the operations computing system can identify the plurality of candidate vehicles from a plurality of autonomous vehicles and/or non-autonomous vehicles associated with the one or more vehicle providers. Each candidate vehicle in the plurality of candidate vehicles can be available to perform at least one portion of the vehicle route. For example, each candidate vehicle can be available and able to perform a vehicle service. This can include being signed online with the service platform of the service entity to be available to receive data for performing a vehicle service and not currently performing a vehicle service (e.g., transporting a user and/or item, etc.) or at least being substantially complete with a current vehicle service such that the vehicle will become available within a reasonable time period for another assignment. In some implementations, the operations computing system can identify the plurality of candidate vehicles based at least in part on a location associated with each of the plurality of vehicles. By way of example, the plurality of candidate vehicles can include a plurality of vehicles within a threshold distance from the start location and/or the end location of a service request.

The operations computing system can segment the vehicle route into one or more route segments based at least in part on one or more operational capabilities associated with each candidate vehicle in the plurality of candidate vehicles. For example, each vehicle in the plurality of vehicles can be associated with one or more operational capabilities. Operational capabilities can include, for example, one or more driving capabilities and/or one or more area permissions. The one or more driving capabilities, for example, can be indicative of a type of autonomous vehicle and/or a type of driver. For example, the one or more driving capabilities can be indicative of a competence level and/or preference of a driver of a non-autonomous vehicle.

In addition, an autonomous vehicle operational capability can be a feature, function, and/or behavior of the autonomous vehicle. Each of the one or more driving capabilities can be indicative of one or more restricted driving maneuvers the autonomous vehicle is unable to perform and/or one or more autonomous driving maneuvers that autonomous vehicle is able to perform. The operational capabilities can include, for example; speed limits and directions (e.g., conformity to specified speed limits, directions of travel, lane restrictions, etc.); stop and go traffic (e.g., ability to properly handle dense traffic conditions with frequent slowdowns, starts, stops, etc.); turning (e.g., ability to handle left hand turns, unprotected turns, three point turns, U-turns, etc.); parking (e.g., parallel parking, required parking space dimensions, etc.); navigating certain geographic features (e.g., crossing train tracks); traveling in reverse (e.g., backing into a parking space); signaling (e.g., handling turn signal(s) from other objects); nudging; handling jaywalkers; and/or other capabilities of an autonomous vehicle. In some implementations, an autonomous vehicle capability can depend on another autonomous vehicle capability. For example, the autonomous vehicle's ability to handle stop-and-go traffic can depend on its ability to handle speed limits and direction.

The operational capabilities can be included in a predefined group (e.g., list, table, etc.) of autonomous vehicle capabilities. For instance, the one or more capabilities can be indicative of a list of capabilities. Each list of capabilities can include one or more maneuvers that the vehicle can safely perform. In some implementations, the absence of a vehicle maneuver from the list of capabilities can be indicative of a restriction. For example, in some implementations, the list of capabilities can be an exhaustive list of driving maneuvers that can be safely performed by a respective vehicle.

In addition, or alternatively, each of the one or more area permissions can be indicative of one or more geographic areas in which an autonomous vehicle and/or a non-autonomous vehicle is permitted to travel. For instance, the one or more area permissions can be indicative of autonomous vehicle capabilities such as operating conditions, routes, and/or the like where one or more autonomous vehicles can safely operate. By way of example, the one or more area permissions can be indicative of one or more geographic regions that the autonomous vehicle is mapped to travel within. In some implementations, if an autonomous vehicle does not have access to mapping data describing a geographic region, the autonomous vehicle may not be associated with area permissions indicative of the geographic region.

In this manner, the operations computing system can differentiate between one or more vehicles based on their capabilities. This, in turn, can allow the operations computing system to leverage different types of vehicles to service a wide geographic area. For example, some autonomous vehicles can be configured to offer better types of services such as, urban transportation, interstate transportation, transportation to airports, etc. By way of example, in some implementations, the operations computing system can pool together multiple service requests into a single segmented route that utilizes multiple urban vehicles configured to pool passengers to a joint interstate transportation vehicle (e.g., a fuel efficient hybrid vehicle, etc.). Thus, by segmenting a vehicle route based on the operational capabilities of a plurality of candidate vehicles, the operations computing system can effectively utilize the computing resources made available by a fleet of vehicles rather than focusing on one vehicle to service an entire route.

The operations computing system can determine the number of vehicles for the service request based on the vehicle route, the one or more operational capabilities associated with each vehicle in the plurality of vehicles, and/or one or more convenience factors associated with at least one user of the service request. For example, the operations computing system can determine the lowest number of candidate vehicles necessary to complete the service request based at least in part on the operational capabilities associated with each of the candidate vehicles. For example, if one candidate vehicle can complete every driving maneuver (e.g., U-turn, right turn, etc.) needed to complete the route and is permitted to travel in the area (e.g., urban area, interstate, etc.) through which the route travels, the operations computing system can determine one vehicle for the service request. However, in the event that no one vehicle can complete the service request, for example, due to one or more operational constraints, the operations computing system can determine that more than one vehicle can be utilized to complete the service request.

In some implementations, the operations computing system can segment the vehicle route into one or more route segments based at least in part on one or more convenience factors associated with the service request. The one or more convenience factors, for example, can include one or more criteria that effect the desirability of choosing a travel route such as, for example, a price, a number of transfer locations, a time, and/or a type of vehicle. The operations computing system can determine the number of vehicles and/or the number of route segments for a service request based at least in part on the one or more convenience factors. For example, the price charged for a vehicle service request can depend on the number of autonomous vehicles that service the vehicle service request. By way of example, in some scenarios, an autonomous vehicle may be cheaper than a human-driven vehicle (e.g., if the route is unfavorable to a human driver). In another example, one autonomous vehicle may be capable of completing an entire route, however, it may be undesirable (e.g., for the user, for the vehicle, etc.) for the autonomous vehicle to travel from its current location to the starting location of the route (e.g., due to traffic, distance, time, etc.). Thus, segmenting a vehicle route into two route segments serviceable by two autonomous vehicles can be a cost effective option for the user. In this way, the operations computing system can determine a number of vehicles over the bare minimum of vehicles (e.g., based on operational capabilities) to traverse a vehicle route based on convenience factors. For example, the operations computing system can determine that two or more vehicles may be utilized to fulfill a service request where one or more operational constraints prevent a single vehicle from fulfilling the service request. In other cases, for example, where one vehicle (e.g., a non-autonomous vehicle, autonomous vehicle, etc.) can fulfill the service request, the operations computing system can nonetheless determine that two vehicles may be advantageous to reduce cost for the user, etc. (e.g., due to unfavorability to the human-driver, inefficiency/location of the one vehicle, etc.)

In some implementations, the operations computing system can determine one or more ancillary vehicle routes for the vehicle route. Each ancillary vehicle route can include one or more driving directions from the start location to the end location based at least in part on a number of vehicles and/or segments associated with the ancillary route. For example, the operations computing system can determine the one or more ancillary vehicle routes based at least in part on the vehicle route, the number of vehicles for the service request, the one or more operational capabilities associated with each vehicle in the plurality of candidate vehicles and/or the one or more convenience factors associated with the service request. In some implementations, each ancillary vehicle route can be associated with a different number of vehicles and/or a different number of segments. By way of example, the operations computing system can determine an ancillary vehicle route for every combination of vehicles capable (e.g., based on operational capabilities) of completing the vehicle service requests. In this manner, the operations computing system can provide a user with one or more options for completing the service request. For example, each ancillary vehicle route can include one or more convenience factors, such as time, price, etc. In some implementations, the operations computing system can allow a user to select a number of vehicles and/or route segments based on the one or more convenience factors associated with the corresponding ancillary vehicle route.

The operations computing system can determine one or more transfer locations for the vehicle route and/or one or more ancillary vehicle routes. For example, the operations computing system can determine one or more transfer locations for a route (e.g., vehicle route, ancillary vehicle route, etc.) associated with two or more of the plurality of candidate vehicles. By way of example, a transfer location can allow a user and/or item to transfer from one vehicle to another. Thus, each transfer location in the one or more transfer locations can be associated with at least two vehicles in the plurality of vehicles in so far as each transfer location can be proximate to an area reachable by at least two vehicles.

The transfer location(s) for a vehicle service can be based at least in part on the start location and the end location associated with the service request. In some implementations, the operations computing system can identify one or more candidate locations in between and/or proximate to the start location and/or the end location. The operations computing system can select the transfer location(s) from the candidate location(s). For example, the operations computing system can obtain information regarding candidate locations in a geographic area that includes the start location and/or end location (e.g., from a location database). The operations computing system can select transfer location(s) from the candidate location(s) by filtering the candidate location(s) based on one or more convenience factors and/or one or more operational capabilities.

By way of example, the operations computing system can determine the one or more transfer locations for a route (e.g., vehicle route, ancillary vehicle route, etc.) based on the one or more operational capabilities associated with each candidate vehicle in the plurality of candidate vehicles. The operations computing system can filter the candidate locations based on the number of vehicles available to service the candidate location due to operational capabilities. The availability of vehicles to service a particular candidate location can be limited by operational restrictions. By way of example, a candidate location in a particular urban area may only be serviceable by a small subset of the plurality of candidate vehicles (e.g., non-autonomous vehicles, autonomous vehicles mapped to the particular urban area, etc.), whereas a candidate location located off the interstate may be serviceable by a larger subset of the plurality of candidate vehicles (e.g., non-autonomous vehicles, interstate trained autonomous vehicles, etc.). Thus, the operations computing system can determine the one or more transfer locations based on vehicle availability due to operational constraints. In addition, or alternatively, the operations computing system can determine the one or more transfer locations for a route (e.g., vehicle route, ancillary vehicle route, etc.) based on the one or more convenience factors associated with the service request. For example, the operations computing system can filter the candidate locations by convenience factors, such as ease of access, number of incident reports, amenities (e.g., reserved parking or staging areas), detour distance, time value, and vehicle availability.

In some implementations, the operations computing system can score the candidate location(s) based the one or more operational capabilities and the one or more convenience factors. The operations computing system can select the transfer location(s) from the candidate location(s) based at least in part on the score. As an example, a candidate location nearby well-maintained existing infrastructure (e.g., roads, wireless coverage, etc.) can be scored higher than a remote candidate location with poor access. As another example, a candidate location with fewer incident reports (e.g., police reports, insurance claims, etc.) than other candidate locations can be scored higher than the other candidate locations. As another example, a candidate location with more amenities or higher-valued amenities than other candidate locations can be scored higher than the other candidate locations. As another example, a candidate location having a shorter detour distance than other candidate locations with respect to a route for the vehicle service can be scored higher than the other candidate location(s). As another example, if a route that includes a candidate location is associated with a shorter completion time than a route that does not include the candidate location (a positive time value), then the candidate location can be scored higher than other candidate locations. Conversely, in the event a route that includes a candidate location is associated with a longer completion time than a route that does not include the candidate location (a negative time value), then the candidate location can be scored lower than other candidate locations. As another example, in the event there are no available vehicles that can arrive at a candidate location within a predetermined window of a user's arrival (e.g., due to operational constraints), then the candidate location can be scored lower than other candidate locations.

In some implementations, the transfer location can be associated with a plurality of service requests. For example, in some implementations, the operations computing system can determine a common transfer location for a route (e.g., vehicle route, ancillary vehicle route, etc.) such that it coincides with an arrival of a plurality of users at the common transfer location. By way of example, the operations computing system can receive a plurality of separate service requests for a vehicle service from a plurality of users. The operations computing system can determine a plurality of routes (e.g., vehicle route, ancillary vehicle route, etc.) based on the plurality of service requests. For example, the operations computing system can determine at least one route (e.g., vehicle route, ancillary vehicle route, etc.) for each service request in the plurality of service requests. The operations computing system can determine one or more candidate locations for each route (e.g., vehicle route, ancillary vehicle route, etc.) in the plurality of routes. In some implementations, the operations computing system can determine a candidate location common to one or more routes (e.g., vehicle route, ancillary vehicle route, etc.) in the plurality of routes. The operations computing system can determine a common transfer location for each of the one or more routes (e.g., vehicle route, ancillary vehicle route, etc.)

based on the candidate location common to the one or more routes. In this manner, the operations computing system can determine a common transfer location for a plurality of service requests that share a portion of a route (e.g., vehicle route, ancillary vehicle route, etc.).

In some implementations, the operations computing system can segment the route (e.g., vehicle route, the one or more ancillary vehicle routes, etc.) into one or more route segments based at least in part on the one or more transfer locations. Each route segment can be serviceable by at least one candidate vehicle in the plurality of candidate vehicles. Thus, the operations computing system can segment the route (e.g., vehicle route, the one or more ancillary vehicle routes, etc.) such that the number of segments match the number of vehicles determined for the route (e.g., vehicle route, the one or more ancillary vehicle routes, etc.). By way of example, each route segment can include a segment start location, a segment end location, and a first and second leg. The segment start and segment end location can include a transfer location and/or the start or the end location associated in the service request. The first leg can be indicative of the path from the vehicle's current location to the segment start location. The second leg can be indicative of the path from the segment start location of the segment to the segment end location.

The operations computing system can assign at least two candidate vehicles to perform the vehicle service by assigning at least one of the route segment(s) to each of the at least two candidate vehicles. The operations computing system can assign a candidate vehicle (of the at least two) to a particular route segment based on the operational capabilities associated with the respective candidate vehicle. For example, the operations computing system can assign a first candidate vehicle to a first route segment based on a first set of operational capabilities associated with the first candidate vehicle. In addition, or alternatively, the operations computing system can assign a second candidate vehicle to a second route segment based on a second set of operational capabilities associated with the second candidate vehicle.

As discussed above, each route segment can include two legs. Thus, in some implementations, the operations computing system can determine that the first candidate vehicle is capable of servicing the at least two legs of the route segment based at least in part on the first set of operational capabilities. For example, the operations computing system can determine that the operational capabilities of the first candidate vehicle are sufficient to reach the segment start location of the first route segment from the first candidate vehicle's current location and the segment end location of the first route segment from the segment start location of the first route segment. As another example, the operations computing system can determine that the second candidate vehicle is capable of servicing the at least two legs of the second route segment based at least in part on the second set of operational capabilities. For example, the operations computing system can determine that the operational capabilities of the second candidate vehicle are sufficient to reach the segment start location of the second route segment from the second candidate vehicle's current location and the segment end location of the second route segment from the segment start location of the second route segment. In some implementations, the first candidate vehicle can be included in a first fleet of autonomous vehicles of a first vehicle provider (e.g., a third party autonomous vehicle of a first vehicle vendor). Additionally, the second candidate vehicle can be included in a second fleet of autonomous vehicles of a second vehicle provider (e.g., a third party autonomous vehicle of a second vehicle vendor).

In some implementations, the operations computing system can pool one or more candidate vehicles together to service a plurality of routes associated with a plurality of separate service requests. For example, the operations computing system can determine one or more common route segments for the plurality of routes based on a common transfer location associated with each route (e.g., vehicle route, ancillary vehicle route, etc.) in the plurality of routes. By way of example, the operation computing system can determine a separate first route segment for each route (e.g., vehicle route, ancillary vehicle route, etc.) in the plurality of routes. In addition, the operations computing system can determine a common second route segment shared by each route (e.g., vehicle route, ancillary vehicle route, etc.) in the plurality of routes. The operations computing system can determine a first vehicle to service each of the separate first route segments associated with each route (e.g., vehicle route, ancillary vehicle route, etc.) in the plurality of routes (e.g., vehicle route, ancillary vehicle route, etc.). The operations computing system can determine one common second vehicle to service the common second route segment shared by each route (e.g., vehicle route, ancillary vehicle route, etc.) in the plurality of routes. In this manner, a plurality of users associated with separate vehicle service requests can be pooled into the same common second vehicle. For example, users from all over a certain neighborhood can be pooled into an autonomous vehicle for highway travel to the city and then dispersed into a first autonomous vehicle for another transfer location, a final destination, etc.

The operations computing system can provide transit data indicative of the vehicle route, the number of vehicles for the route, and/or the one or more segments of the vehicle route to a user. For example, the operations computing system can provide the transit data to the user via a user device (e.g., laptop, smartphone, or other computing device). For example, the transit data can include a virtual representation of the vehicle route, an indication of one or more transfer locations and/or segments associated with the route, an indication of the one or more vehicles assigned to service the route, a price, and/or other information relevant to the service request. In some implementations, the operations computing system can, in response to receiving the service request for a vehicle service for a user, provide data indicative of the vehicle route and one or more ancillary vehicle routes to the user. For example, the operations computing system can provide one or more options to the user. Each option can include an ancillary vehicle route and transit data corresponding to the ancillary vehicle route. In this manner, the user can select a vehicle route based on one or more user preferences (e.g., time, price, number of transfer locations, etc.)

The operations computing system can communicate data associated with the service request for the at least two candidate vehicles. Data sent for the candidate vehicles can be sent directly to the candidate vehicles and/or to a remote computing system that is associated with the respective candidate vehicle and remote from the candidate vehicle. For example, the operations computing system can communicate data indicative of the first route segment for the first candidate vehicle (e.g., to the first candidate vehicle, to an offboard system associated therewith, etc.) and data indicative of the second route segment to the second candidate vehicle (e.g., to the second candidate vehicle, to an offboard system associated therewith, etc.). The data indicative of the service request can include a request and/or a command for the candidate vehicle to service a particular segment of the route (e.g., vehicle route, one or more ancillary route, etc.). For example, the data indicative of the service request can include a request for a third party vehicle (e.g., vehicles owned by a third party service provider, etc.) to service the request. In another example, the data indicative of the route (e.g., vehicle route, one or more ancillary, etc.) can include a command for a first party vehicle operated by the service entity to service the request.

The systems and methods described herein may provide a number of technical effects and benefits. For instance, by segmenting a route based at least in part on the operational capabilities of the autonomous vehicles and/or on one or more transfer locations, the operations computing system can select a vehicle to service each segment independently. This, in turn, can enable the operations computing system to fulfill a transportation service request with one or more vehicles with limited operational capability. The service entity can determine one or more transfer location(s) based on the operational capability associated with each vehicle in a plurality of vehicles available to fulfill service requests. In this way, the autonomous vehicles can be allocated service assignments and route segments that are consistent with the autonomy and navigation capabilities of the vehicle. An autonomous vehicle can more efficiently utilize its onboard computing resources (e.g., processing resources, memory resources, power resources, etc.) to complete travel without attempting to undertake maneuvers that the autonomous vehicle may not be able to complete or may only be able to compete with considerable computational usage. As such, the autonomous vehicles can avoid wasting onboard processing, memory, power, etc. trying to perform in scenarios that are inappropriate for the vehicle's given autonomy ability.

Moreover, the service entity can be afforded increased flexibility in managing its resources by pooling vehicles to maximize vehicle productivity. This can allow for a reduction in the cost associated with maintaining vehicles, providing transportation services, and potentially expanding the number of services delivered. Additionally, an interdependence among users in a single rideshare/ride hailing service can be reduced, thereby lowering a chance that a delay affecting one user will also affect other users.

Example aspects of the present disclosure can provide a number of improvements to vehicle computing technology, such as autonomous vehicle computing technology. For example, the system and methods provide an improved approach for efficiently operating autonomous vehicles while allocating the provision of vehicle services. The computing system can receive a service request for a vehicle service. The vehicle service request can include a start location and an end location. The computing system can determine a vehicle route from the start location to the end location. The computing system can identify a plurality of candidate vehicles from a plurality of autonomous vehicles. For example, each candidate vehicle in the plurality of candidate vehicles can be available to perform at least one portion of the vehicle route. The computing system can obtain data indicative of one or more operational capabilities for each candidate vehicle in the plurality of autonomous vehicles. The computing system can segment the vehicle route into one or more route segments based, at least in part, on the one or more operational capabilities associated with each autonomous vehicle in the plurality of autonomous vehicles. The computing system can assign at least two candidate vehicles to perform the vehicle service by assigning at least one of the one or more route segments to each of the at least two candidate vehicles. And, the computing system can communicate data indicative of the service request to the at least two candidate vehicles. In this manner, the computing system employs a new kind of allocation system that increases the efficiency, scalability, and practicality of utilizing autonomous vehicles to provide vehicle services. For example, the computing system can save autonomous vehicle resources by allocating vehicles to service a portion of a vehicle route based on operational capabilities associated with the vehicles. In this manner, the computing system can accumulate and utilize newly available information such as, for example, the operational capabilities to provide a practical improvement to autonomous vehicle technology; thereby, improving the functioning of autonomy systems in general by factoring capabilities unique to autonomy computing systems into the provision of vehicle services.

Various means can be configured to perform the methods and processes described herein. For example, a computing system can include data obtaining unit(s), route planning unit(s), vehicle grouping unit(s), segmentation unit(s), data providing unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., data obtaining unit(s), etc.) can be configured to obtain data representing one or more service requests. For example, each service request can be associated with a vehicle service for a user and can include a start location and an end location. In addition, in some implementations, the means (e.g., the data obtaining unit(s), etc.) can obtain vehicle data indicative of one or more operational capabilities associated with a plurality of vehicle and map data indicative of one or more geographic areas.

In addition, the means (e.g., route planning unit(s), etc.) can be configured to determine a vehicle route from the start location to the end location associated with a service request. For example, the means (e.g., route planning unit(s), etc.) can determine the vehicle route based on map data indicative of one or more geographic areas including the start location and the end location of the service request. The vehicle route, for example, can include driving directions sufficient to direct a vehicle from the start location to the end location.

In addition, the means (e.g., candidate identification unit(s), etc.) can be configured to identify a plurality of candidate vehicles from a plurality of autonomous vehicles. For example, the plurality of candidate vehicles can be available to perform at least one portion of the vehicle route. By way of example, the plurality of candidate vehicle can include a subset of a plurality of autonomous vehicles close enough to service a portion of the vehicle route.

In addition, the means (e.g., segmentation unit(s), etc.) can be configured to segment the vehicle route into one or more route segments based on one or more operational capabilities associated with each autonomous vehicle in the plurality of autonomous vehicles. In addition, or alternatively, the means (e.g., segmentation unit(s), etc.) can be configured to segment the vehicle route into one or more route segments based on one or more convenience factors associated with the service request. In some implementations, the means (e.g., segmentation unit(s), etc.) can be configured to generate one or more ancillary routes. Each ancillary route, for example, can include a different number of segments. The one or more ancillary routes can be generated based on the convenience factors associated with the service request.

In addition, the means (e.g., vehicle assignment unit(s), etc.) can be configured to assign at least two candidate vehicles to perform the vehicle service. For example, the means (e.g., vehicle assignment unit(s), etc.) can assign the candidate vehicles by assigning at least one of the one or more route segments to each of the at least two candidate vehicles. By way of example, the (e.g., vehicle assignment unit(s), etc.) can be configured to determine that a candidate vehicle is capable of servicing a particular segment of the vehicle route. The means (e.g., vehicle assignment unit(s), etc.) can assign a candidate vehicle to a particular route segment based on such a determination.

In addition, the means (e.g., data providing unit(s), etc.) can be configured to communicate data indicative of the service request to the at least two candidate vehicles. For example, the means (e.g., data providing unit(s), etc.) can communicate data indicative of a request and/or a command for a candidate vehicle to service at least one segment of the vehicle route. In addition, or alternatively, the means (e.g., data providing unit(s), etc.) can be configured to provide transit data indicative of the service request to a user of a user device. In this manner, the means (e.g., data providing unit(s), etc.) can inform a user of one or more segments and/or candidate vehicle determined for the vehicle route.

With reference now to the FIGS., example aspects of the present disclosure will be discussed in further detail. FIG. 1 illustrates an example vehicle computing system 112 according to example embodiments of the present disclosure. The vehicle computing system 112 can be associated with a vehicle 102. The vehicle computing system 112 can be located onboard (e.g., included on and/or within) the vehicle 102.

FIG. 1 depicts a block diagram of an example system 100 for controlling the navigation of an autonomous vehicle according to example embodiments of the present disclosure. As illustrated, FIG. 1 shows a system 100 that can include a vehicle 102; an operations computing system 104; one or more remote computing devices 106; a communication network 108; a vehicle computing system 112; one or more autonomy system sensors 114; autonomy system sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 (e.g., operations system) can be associated with a service entity that can provide one or more vehicle services to a plurality of users, passengers, riders, etc. via one or more fleets of vehicles that includes, for example, the vehicle 102. The vehicle services can include transportation services (e.g., rideshare services), courier services, delivery services, and/or other types of services.

As described in greater detail herein, the operations computing system 104 can include various sub-systems/back-ends that are configured to perform various functions. For example, the operations computing system 104 (e.g., a matching/deployment system back-end) can be configured to receive a service request for a vehicle service. The operations computing system 104 (e.g., a routing system back-end) can be configured to determine a vehicle route based on the service request. In addition, the operations computing system 104 (e.g., the matching/deployment system back-end) can be configured to identify a plurality of candidate vehicles available to perform at least a portion of the vehicle route. As further described herein, the operations computing system 104 can be configured to segment the vehicle route based on one or more operational capabilities associated with each candidate vehicle and assign at least one candidate vehicle to service each route segment of the vehicle route. The operations computing system 104 can communicate data indicative of the service request for the candidate vehicles (e.g., directly and/or indirectly to the vehicles, etc.). In this manner, the operations computing system 104 can be configured to facilitate a transportation service utilizing multiple vehicles, where appropriate.

More particularly, the operations computing system 104 can include multiple components for performing various operations and functions. For example, the operations computing system 104 can include and/or otherwise be associated with the one or more computing devices that are remote from the vehicle 102. The one or more computing devices of the operations computing system 104 can include one or more processors and one or more memory devices. The one or more memory devices of the operations computing system 104 can store instructions that when executed by the one or more processors cause the one or more processors to perform operations and functions associated with operation of one or more vehicles (e.g., a fleet of vehicles), coordination of vehicle services, and/or other operations as discussed herein.

For example, the operations computing system 104 can be configured to monitor and communicate with the vehicle 102 and/or its users to coordinate a vehicle service provided by the vehicle 102. To do so, the operations computing system 104 can manage a database that includes data including vehicle status data associated with the status of vehicles including the vehicle 102 and/or vehicle capabilities data associated with the capabilities of vehicles include the vehicle 102. The vehicle status data, for example, can include a state of a vehicle, a location of a vehicle (e.g., a latitude and longitude of a vehicle), the availability of a vehicle (e.g., whether a vehicle is available to pick-up or drop-off passengers and/or cargo, etc.), the status of one or more vehicle systems, the status of one or more autonomous robots, and/or the state of objects internal and/or external to a vehicle (e.g., the physical dimensions and/or appearance of objects internal/external to the vehicle). The vehicle capabilities data, for example, can include one or more operational capabilities associated with a vehicle.

The operations computing system 104 can communicate with the one or more remote computing devices 106 and/or the vehicle 102 via one or more communications networks including the communications network 108. The communications network 108 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102.

Each of the one or more remote computing devices 106 can include one or more processors and one or more memory devices. The one or more memory devices can be used to store instructions that when executed by the one or more processors of the one or more remote computing devise 106 cause the one or more processors to perform operations and/or functions including operations and/or functions associated with the vehicle 102 including exchanging (e.g., sending and/or receiving) data or signals with the vehicle 102, monitoring the state of the vehicle 102, and/or controlling the vehicle 102; and/or the like. The one or more remote computing devices 106 can communicate (e.g., exchange data and/or signals) with one or more devices including the operations computing system 104 and the vehicle 102 via the communications network 108.

The one or more remote computing devices 106 can include one or more computing devices (e.g., a desktop computing device, a laptop computing device, a smart phone, and/or a tablet computing device) that can receive input or instructions from a user or exchange signals or data with another computing device or computing system (e.g., the operations computing system 104). Further, the one or more remote computing devices 106 can be used to determine and/or modify one or more states of the vehicle 102 including a location (e.g., a latitude and longitude), a velocity, acceleration, a trajectory, and/or a path of the vehicle 102 based in part on signals or data exchanged with the vehicle 102. In some implementations, the operations computing system 104 can include the one or more remote computing devices 106.

The vehicle 102 can be a ground-based vehicle (e.g., an automobile, truck, etc.), an aircraft, and/or another type of vehicle (e.g., watercraft, bicycle, scooter, other light electric vehicle, etc.). The vehicle 102 can be an autonomous vehicle that can perform various actions including driving, navigating, and/or operating, with minimal and/or no interaction from a human driver. The autonomous vehicle 102 can be configured to operate in one or more modes including, for example, a fully autonomous operational mode, a semi-autonomous operational mode, a park mode, a sleep mode, and/or the like. A fully autonomous (e.g., self-driving) operational mode can be one in which the vehicle 102 can provide driving and navigational operation with minimal and/or no interaction from a human driver present in the vehicle. A semi-autonomous operational mode can be one in which the vehicle 102 can operate with some interaction from a human driver present in the vehicle. Park and/or sleep modes can be used between operational modes while the vehicle 102 performs various actions including waiting to provide a subsequent vehicle service, and/or recharging between operational modes.

An indication, record, and/or other data indicative of the state of the vehicle, the state of one or more passengers of the vehicle, the state of an environment including one or more objects (e.g., the physical dimensions and/or appearance of the one or more objects) and/or the operational capabilities of the vehicle (e.g., ability to make a left turn, U-turn, etc.) can be stored locally in one or more memory devices of the vehicle 102. Additionally, the vehicle 102 can provide data indicative of the state of the vehicle, the state of one or more passengers of the vehicle, the state of an environment and/or the operational capabilities of the vehicle to the operations computing system 104, which can store an indication, record, and/or other data indicative of the state of the vehicle, the state of one or more passengers of the vehicle, the state of an environment and/or the operational capabilities of the vehicle in one or more memory devices associated with the operations computing system 104 (e.g., remote from the vehicle). Furthermore, the vehicle 102 can provide data indicative of the state of the one or more objects (e.g., physical dimensions and/or appearance of the one or more objects) within a predefined distance of the vehicle 102 to the operations computing system 104, which can store an indication, record, and/or other data indicative of the state of the one or more objects within a predefined distance of the vehicle 102 in one or more memory devices associated with the operations computing system 104 (e.g., remote from the vehicle).

The vehicle 102 can include and/or be associated with the vehicle computing system 112. The vehicle computing system 112 can include one or more computing devices located onboard the vehicle 102. For example, the one or more computing devices of the vehicle computing system 112 can be located on and/or within the vehicle 102. The one or more computing devices of the vehicle computing system 112 can include various components for performing various operations and functions. For instance, the one or more computing devices of the vehicle computing system 112 can include one or more processors and one or more tangible, non-transitory, computer readable media (e.g., memory devices). The one or more tangible, non-transitory, computer readable media can store instructions that when executed by the one or more processors cause the vehicle 102 (e.g., its computing system, one or more processors, and other devices in the vehicle 102) to perform operations and functions, including those described herein.

As depicted in FIG. 1, the vehicle computing system 112 can include the one or more autonomy system sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more autonomy system sensors 114 can be configured to generate and/or store data including the autonomy sensor data 116 associated with one or more objects that are proximate to the vehicle 102 (e.g., within range or a field of view of one or more of the one or more sensors 114). The one or more autonomy system sensors 114 can include a Light Detection and Ranging (LIDAR) system, a Radio Detection and Ranging (RADAR) system, one or more cameras (e.g., visible spectrum cameras and/or infrared cameras), motion sensors, and/or other types of imaging capture devices and/or sensors. The autonomy sensor data 116 can include image data, radar data, LIDAR data, and/or other data acquired by the one or more autonomy system sensors 114. The one or more objects can include, for example, pedestrians, vehicles, bicycles, lights, and/or other objects. The one or more sensors can be located on various parts of the vehicle 102 including a front side, rear side, left side, right side, top, or bottom of the vehicle 102. The autonomy sensor data 116 can be indicative of locations associated with the one or more objects within the surrounding environment of the vehicle 102 at one or more times. For example, autonomy sensor data 116 can be indicative of one or more LIDAR point clouds associated with the one or more objects within the surrounding environment. The one or more autonomy system sensors 114 can provide the autonomy sensor data 116 to the autonomy computing system 120.

In addition to the autonomy sensor data 116, the autonomy computing system 120 can retrieve or otherwise obtain data including the map data 122. The map data 122 can provide detailed information about the surrounding environment of the vehicle 102. For example, the map data 122 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 102. The positioning system 118 can be any device or circuitry for analyzing the position of the vehicle 102. For example, the positioning system 118 can determine position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 102 can be used by various systems of the vehicle computing system 112 and/or provided to one or more remote computing devices (e.g., the operations computing system 104 and/or the remote computing device 106). For example, the map data 122 can provide the vehicle 102 relative positions of the surrounding environment of the vehicle 102. The vehicle 102 can identify its position within the surrounding environment (e.g., across six axes) based at least in part on the data described herein. For example, the vehicle 102 can process the autonomy sensor data 116 (e.g., LIDAR data, camera data) to match it to a map of the surrounding environment to get an understanding of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 102 and determine a motion plan for controlling the motion of the vehicle 102 accordingly. For example, the autonomy computing system 120 can receive the autonomy sensor data 116 from the one or more autonomy system sensors 114, attempt to determine the state of the surrounding environment by performing various processing techniques on the autonomy sensor data 116 (and/or other data), and generate an appropriate motion plan through the surrounding environment. The autonomy computing system 120 can control the one or more vehicle control systems 138 to operate the vehicle 102 according to the motion plan.

The perception system 124 can identify one or more objects that are proximate to the vehicle 102 (e.g., within a sensors field of view, range, etc.) based on autonomy sensor data 116 received from the autonomy system sensors 114. In particular, in some implementations, the perception system 124 can determine, for each object, state data 130 that describes a current state of such object. As examples, the state data 130 for each object can describe an estimate of the object's: current location (also referred to as position); current speed; current heading (which may also be referred to together as velocity); current acceleration; current orientation; size/footprint (e.g., as represented by a bounding shape such as a bounding polygon or polyhedron); class of characterization (e.g., vehicle class versus pedestrian class versus bicycle class versus other class); yaw rate; and/or other state information. In some implementations, the perception system 124 can determine state data 130 for each object over a number of iterations. In particular, the perception system 124 can update the state data 130 for each object at each iteration. Thus, the perception system 124 can detect and track objects (e.g., vehicles, bicycles, pedestrians, etc.) that are proximate to the vehicle 102 over time, and thereby produce a presentation of the world around a vehicle 102 along with its state (e.g., a presentation of the objects of interest within a scene at the current time along with the states of the objects).

The prediction system 126 can receive the state data 130 from the perception system 124 and predict one or more future locations and/or moving paths for each object based on such state data. For example, the prediction system 126 can generate prediction data 132 associated with each of the respective one or more objects proximate to the vehicle 102. The prediction data 132 can be indicative of one or more predicted future locations of each respective object. The prediction data 132 can be indicative of a predicted path (e.g., predicted trajectory) of at least one object within the surrounding environment of the vehicle 102. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the vehicle 102 based at least in part on the prediction data 132 (the state data 130 and/or other data). The motion plan data 134 can include vehicle actions with respect to the objects proximate to the vehicle 102 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 102 can perform a certain action (e.g., pass an object) without increasing the potential risk to the vehicle 102 and/or violating any traffic laws (e.g., speed limits, lane boundaries, signage). The motion plan data 134 can include a planned trajectory, velocity, acceleration, and/or other actions of the vehicle 102.

As one example, in some implementations, the motion planning system 128 can determine a cost function for each of one or more candidate motion plans for the autonomous vehicle 102 based at least in part on the current locations and/or predicted future locations and/or moving paths of the objects. For example, the cost function can describe a cost (e.g., over time) of adhering to a particular candidate motion plan. For example, the cost described by a cost function can increase when the vehicle 102 approaches impact with another object and/or deviates from a preferred pathway (e.g., a predetermined travel route).

Thus, given information about the current locations and/or predicted future locations and/or moving paths of objects, the motion planning system 128 can determine a cost of adhering to a particular candidate pathway. The motion planning system 128 can select or determine a motion plan for the autonomous vehicle 102 based at least in part on the cost function(s). For example, the motion plan that minimizes the cost function can be selected or otherwise determined. The motion planning system 128 then can provide the selected motion plan to a vehicle controller that controls one or more vehicle controls (e.g., actuators or other devices that control gas flow, steering, braking, etc.) to execute the selected motion plan.

The motion planning system 128 can provide the motion plan data 134 with data indicative of the vehicle actions, a planned trajectory, and/or other operating parameters to the vehicle control systems 138 to implement the motion plan data 134 for the vehicle 102. For instance, the vehicle 102 can include a mobility controller configured to translate the motion plan data 134 into instructions. By way of example, the mobility controller can translate a determined motion plan data 134 into instructions for controlling the vehicle 102 including adjusting the steering of the vehicle 102 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections, etc.). In some implementations, the communications system 136 can allow communication among one or more of the systems onboard the vehicle 102. The communications system 136 can also be configured to enable the autonomous vehicle to communicate with and/or provide and/or receive data and/or signals from a remote computing device 106 associated with a user, an item (e.g., an item to be picked-up for a courier service), and/or the like. The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop, and/or smartphone) can be viewable by a user of the vehicle 102 that is located in the front of the vehicle 102 (e.g., operator's seat, etc.). Additionally, or alternatively, a display device can be viewable by a user of the vehicle 102 that is located in the rear of the vehicle 102 (e.g., a passenger seat).

The vehicle computing system 112 can communicate data between the vehicle 102 and the human-machine interface 140. The data can be communicated to and/or from the vehicle 102 directly and/or indirectly (e.g., via another computing system). For example, in some implementations, the data can be communicated directly from the vehicle computing system 112 to the human-machine interface 140. In addition, or alternatively, the vehicle computing system 112 can communicate with the human-machine interface 140 indirectly, via another computing system, such as, for example, a system of a third party vehicle provider/vendor.

Figure 2:
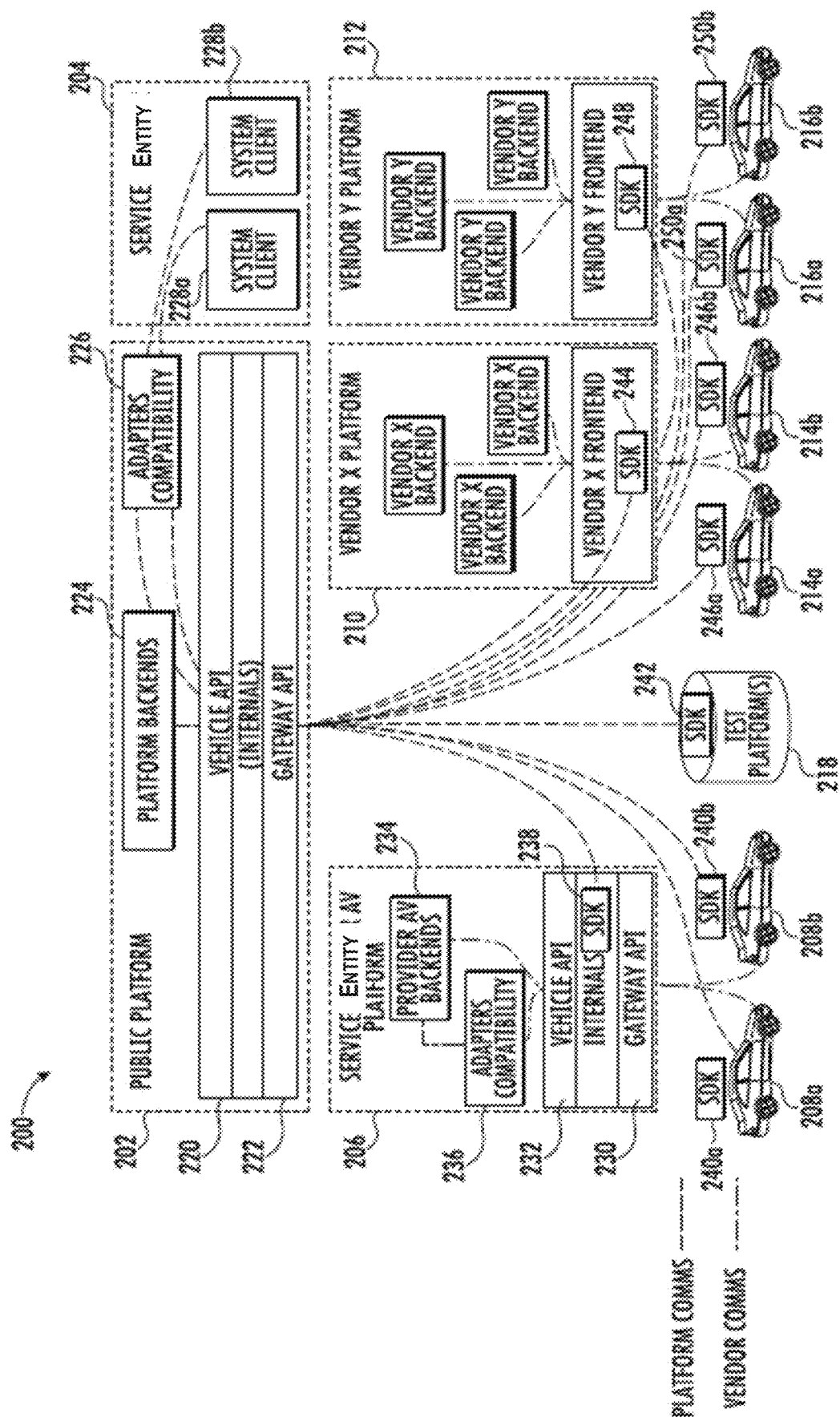
FIG. 2 depicts an example infrastructure system according to example embodiments of the present disclosure.

FIG. 2 depicts an example service infrastructure 200 according to example embodiments of the present disclosure. As described below, the service infrastructure 200 can include one or more components that are included in an operations computing system 104 for providing the type of vehicle services and control of the present disclosure.

As illustrated in FIG. 2, an example service infrastructure 200, according to example embodiments of the present disclosure, can include an application programming interface platform (e.g., public platform) 202, a service entity system 204, a service entity autonomous vehicle platform (e.g., private platform) 206, one or more service entity autonomous vehicles (e.g., first party autonomous vehicles in a service entity fleet) such as autonomous vehicles 208a and 208b, and one or more test platforms 218. For example, the service entity may own, lease, etc. a fleet of autonomous vehicles that can be managed by the service entity (e.g., its backend system clients) to provide one or more vehicle services. The autonomous vehicle(s) 208a, 208b utilized to provide the vehicle service(s) can be included in this fleet of the service entity. Such autonomous vehicle may be referred to as "service entity autonomous vehicles" or "first party autonomous vehicles." Additionally, the service infrastructure 200 can also be associated with and/or in communication with one or more third-party entity systems such as vendor platforms 210 and 212, and/or one or more third-party entity autonomous vehicles (e.g., in a third-party entity autonomous vehicle fleet) such as autonomous vehicles 214a, 214b, 216a, and 216b. For instance, the autonomous vehicle 214a, 214b, 216a, and 216b can be associated with a third party vehicle provider such as, for example, an individual, an original equipment manufacturer (OEM), a third party vendor, or another entity. These autonomous vehicles may be referred to as "third party autonomous vehicles." Even though such an autonomous vehicle 214a, 214b, 216a, and 216b may not be included in the fleet of autonomous vehicles of the service entity, the service entity infrastructure 200 can include a platform that can allow the autonomous vehicle(s) 214a, 214b, 216a, and 216b associated with a third party to still be utilized to provide the vehicle services offered by the service entity, access the service entity's system clients, and/or the like.

In some implementations, the VIP component described herein can include one or more of the platforms and related components illustrated in the service infrastructure 200 of FIG. 2. As described herein, a service infrastructure 200 can include a public platform 202 to facilitate vehicle services (e.g., provided via one or more system clients (228a, 228b) associated with a service entity operations computing system) between the service entity infrastructure system 204 (e.g., operations computing system, etc.) and vehicles associated with one or more entities (e.g., vehicles associated with the service entity (208a, 208b), vehicles associated with third-party entities (214a, 214b, 216a, 216b), etc.). For example, in some embodiments, the public platform 202 can provide access to services (e.g., associated with the service provider system 204) such as trip assignment services, routing services, supply positioning services, payment services, and/or the like.

The public platform 202 can include a gateway API (e.g., gateway API 222) to facilitate communication from the autonomous vehicles to the service entity infrastructure services (e.g., system clients 228a, 228b, etc.) and a vehicle API (e.g., vehicle API 220) to facilitate communication from the service entity infrastructure services (e.g., system clients 228a, 228b, etc.) to the vehicles (e.g., 208a, 208b, 214a, 214b, 216a, 216b). For example, the public platform 202, using the vehicle API 220, can query the vehicles (e.g., 208a, 208b, 214a, 214b, 216a, 216b) and/or third party systems/platforms to determine an availability (e.g., to accept a vehicle service assignment, vehicle operational capability, etc.). The vehicles and/or other systems can transmit data (e.g., availability data, operational capability data, etc.) to the public platform 202 using the gateway API 222.

In some embodiments, the public platform 202 can be a logical construct that contains all vehicle and/or service facing interfaces. The public platform 202 can include a plurality of backend services interfaces (e.g., public platform backend interfaces 224). Each backend interface 224 can be associated with at least one system client (e.g., service provider system 204 clients such as system clients 228a and 228b). A system client (e.g., 228a, 228b, etc.) can be the hardware and/or software implemented on a computing system (e.g., operations computing system of the service entity) that is remote from the vehicle and that provides a particular back-end service to a vehicle (e.g., scheduling of vehicle service assignments, routing services, payment services, user services, vehicle rating services, etc.). A backend interface 224 can be the interface (e.g., a normalized interface) that allows one application and/or system (e.g., of the autonomous vehicle) to provide data to and/or obtain data from another application and/or system (e.g., a system client). Each backend interface 224 can have one or more functions that are associated with the particular backend interface. A vehicle can provide a communication to the public platform 202 to call a function of a backend interface. In this way, the backend interface(s) 224 can be an external facing edge of the service entity infrastructure system 204 that is responsible for providing a secure tunnel for a vehicle and/or other system to communicate with a particular service provider system client (e.g., 228a, 228b, etc.) so that the vehicle and/or other system can utilize the backend service associated with that particular service entity system client (e.g., 228a, 228b, etc.), and vice versa.

In some embodiments, the public platform 202 can include one or more adapters 226, for example, to provide compatibility between one or more backend interfaces 224 and one or more service entity system clients (e.g., 228a, 228b, etc.). In some embodiments, the adapter(s) 226 can provide upstream and/or downstream separation between the service entity operations computing system 204 (e.g., operations computing system 104, system clients 228a, 228b, etc.) and the public platform 202 (e.g., backend interfaces 224, etc.). In some embodiments, the adapter(s) 226 can provide or assist with data curation from upstream services (e.g., system clients), flow normalization and/or consolidation, extensity, and/or the like.

The service infrastructure 200 can include a private platform 206 to facilitate service provider-specific (e.g., internal, proprietary, etc.) vehicle services (e.g., provided via one or more system clients (228a, 228b) associated with the service entity operations computing system (e.g., operations computing system 104, etc.) between the service entity infrastructure system 204 and vehicles associated with the service entity (e.g., vehicles 208a, 208b). For example, in some embodiments, the private platform 206 can provide access to service entity services that are specific to the service entity vehicle fleet (e.g., first party autonomous vehicles 208a and 208b) such as fleet management services, autonomy assistance services, and/or the like.

The private platform 206 can include a gateway API (e.g., gateway API 230) to facilitate communication from the vehicles 208a, 208b to one or more service entity infrastructure services (e.g., via the public platform 202, via one or more service entity autonomous vehicle backend interfaces 234, etc.) and a vehicle API (e.g., vehicle API 232) to facilitate communication from the service entity infrastructure services (e.g., via the public platform 202, via one or more service provider vehicle backend interfaces 234, etc.) to the vehicles 208a, 208b. The private platform 206 can include one or more backend interfaces 234 associated with at least one system client (e.g., service provider vehicle-specific system clients, such as fleet management, autonomy assistance, etc.). In some embodiments, the private platform 206 can include one or more adapters 236, for example, to provide compatibility between one or more service entity vehicle backend interfaces 234 and one or more private platform APIs (e.g., vehicle API 232, gateway API 230).

In some embodiments, the service infrastructure 200 can include a test platform 218 for validating and vetting end-to-end platform functionality, without use of a real vehicle on the ground. For example, the test platform 218 can simulate trips with human drivers and/or support fully simulated trip assignment and/or trip workflow capabilities.

The service infrastructure 200 can be associated with and/or in communication with one or more third-party entity systems, such as third-party entity (e.g., Vendor X) platform 210 and third-party entity (e.g., Vendor Y) platform 212, and/or one or more third-party entity vehicles (e.g., in a third-party entity vehicle fleet) such as third-party vehicles 214a, 214, 216a, and 216b. The third-party entity platforms 210, 212 can be distinct and remote from the service provide infrastructure and provide for management of vehicles associated with a third-party entity fleet, such as third-party entity (e.g., Vendor X) vehicles 214a, 214b and third-party entity (e.g., Vendor Y) vehicles 216a, 216b. The third-party entity (e.g., Vendor X) platform 210 and third-party entity (e.g., Vendor Y) platform 212, and/or third-party entity (e.g., Vendor X) vehicles 214a, 214b and third-party entity (e.g., Vendor Y) vehicles 216a, 216b can communicate with the service entity operations computing system 204 (e.g., system clients, operations computing system 104, etc.) via the public platform 202 to allow the third-party entity platforms and/or vehicles to access one or more service entity infrastructure services (e.g., trip services, routing services, payment services, user services, etc.).

The service infrastructure 200 can include a plurality of software development kits (SDKs) (e.g., set of tools and core libraries), such as SDKs 238, 240a, 240b, 242, 244, 246a, 246b, 248, 250a, and 250b, that provide access to the public platform 202 for use by both the service provider autonomous vehicles (208a, 208b) and the third-party entity vehicles (214a, 214b, 216a, 216b). In some implementations, all external communication with the platforms can be done via the SDKs. For example, the provider entity infrastructure can include both a public SDK and a private SDK and specific endpoints to facilitate communication with the public platform 202 and the private platform 206, respectively. In some embodiments, the service entity vehicle fleet (e.g., vehicle 208a, 208b) and/or test platform 218 can use both the public SDK and the private SDK, whereas the third-party entity autonomous vehicles (vehicle 214a, 214b, 216a, 216b) can use only the public SDK and associated endpoints. In some implementations, the SDKs can provide a single entry point into the service entity infrastructure (e.g., public platform 202, etc.), which can improve consistency across both the service provider fleet and the third-party entity fleet(s). As an example, a public SDK can provide secured access to the public platform 202 by both service entity vehicles and third-party entity (and/or systems) and access to capabilities such as trip assignment, routing, onboarding new vehicles, supply positioning, monitoring and statistics, a platform sandbox (e.g., for integration and testing), and/or the like. The private SDK can be accessed by the service entity vehicles and provide access to capabilities such as remote assistance, vehicle management, operational data access, fleet management, and/or the like.

In some embodiments, the SDKs can include a command-line interface to provide an entry point into the SDK components and act as a gateway for SDK related work, integration, testing, and authentication. For example, the command-line tools can provide for bootstrapping, managing authentication, updating SDK version, testing, debugging, and/or the like. In some implementations, a command-line interface can require an authentication certificate before being able to bootstrap an SDK, download components, and/or access a service entity's services. For example, based on the authentication certificate, a command-line interface can determine which version of the SDK (e.g., public or private) to which to provide access.

FIG. 3 depicts an example service request 300 according to example embodiments of the present disclosure. For example, the operations computing system 104 can receive a service request 300 for a vehicle service. For instance, the service request 300 can be data that includes a user transportation service request 305 for one or more users. In addition, or alternatively, the service request 300 can include a product transportation service request for one or more items (e.g., items/products for personal delivery, bulk items for business, freight transportation, baggage, other payloads, etc.). In this regard, the service request 300 can include data indicative of a request for any vehicle service for any purpose (e.g., transportation, observation, etc.).

For example, the vehicle service can be associated with a user. By way of example, the operations computing system 104 (e.g., the matching/deployment system back-end) can receive a user transportation service request 305 for a transportation service for a user of a service entity. A service entity, for example, can operate, maintain, manage, etc. a vehicle platform that coordinates the provision of vehicle services. To do so, the service entity can receive one or more service requests for one or more users of the service entity.

In some implementations, the operations computing system 104 can receive the service request 300 from the user via a user device (e.g., one or more remote computing devices 106). For example, the user of a service entity can communicate with the service entity via one or more user devices. In some implementations, the operations computing system 104 can receive data indicative of the service request 300 from another system (e.g., associated with the service entity, associated with a third party, etc.).

The user transportation service request 305 can include data associated with the user and/or the transportation service. For example, the user transportation service request 305 can include a request identifier 310, a start location 315, an end location 320, user preferences 325, a vehicle route 330, and one or more projected route features 335A-335D. By way of example, the user transportation service request 305 can include a request identifier 310 indicative of service request 300, the timing of the service request 300, etc. In addition, the user transportation service request 305 can include a start location 315 and an end location 320 indicative of a geographic location. The geographic location can include, for example, one or more geographic coordinates, reference landmarks, global positioning data, etc. For example, the user transportation service request 305 can be associated with a transportation service for a user from the start location 315 (e.g., a requested origin, etc.) to the end location 320 (e.g., a requested destination, etc.). By way of example, the start location 315 can include the location (e.g., current location, anticipated location, etc.) of the user and the end location can include a desired location of the user.

In some implementations, the user transportation service request 305 can include one or more user preferences 325. The one or more user preferences 325, for example, can include a number of vehicles, a price range, a time, etc. By way of example, the user associated with the user transportation service request 305 can specify one or user preferences 325 for the transportation service. In addition, or alternatively, the user can be associated with a user profile indicative of one or more user preferences. For example, in some implementations, a user of service entity can create a user profile for the service entity. The user profile can indicate one or more user preferences for future service requests from the user.

In some implementations, the operations computing system 104 can determine one or more projected route features such as, for example, a projected time 335A, a projected traffic level 335B, a projected service price 335C, and/or projected incentives 335D for the vehicle service. The operations computing system 104 can determine the projected route features based on number factors. For example, the operations computing system can analyze historical data to determine the one or more projected route feature. For instance, the operations computing system 104 can determine the one or more projected route features based on a plurality of previous service requests. By way of example, the operations computing system 104 can receive a plurality of previous service requests with one or more similar attributes (e.g., similar start location, end location, time of day, etc.) to the service request 300. The operations computing system 104 can analyze the results of the plurality of previous similar service requests to determine the one or more projected route features for the service request 300.

In addition, the operations computing system 104 can determine a vehicle route 330 for the transportation service request 305. For example, and as described in further detail below, the operations computing system 104 can determine the vehicle route 330 from the start location 315 of the service request 300 to the end location 320 of the service request. The vehicle route 330, for example, can include one or more directions from the start location 315 to the end location 320.

Figure 4:
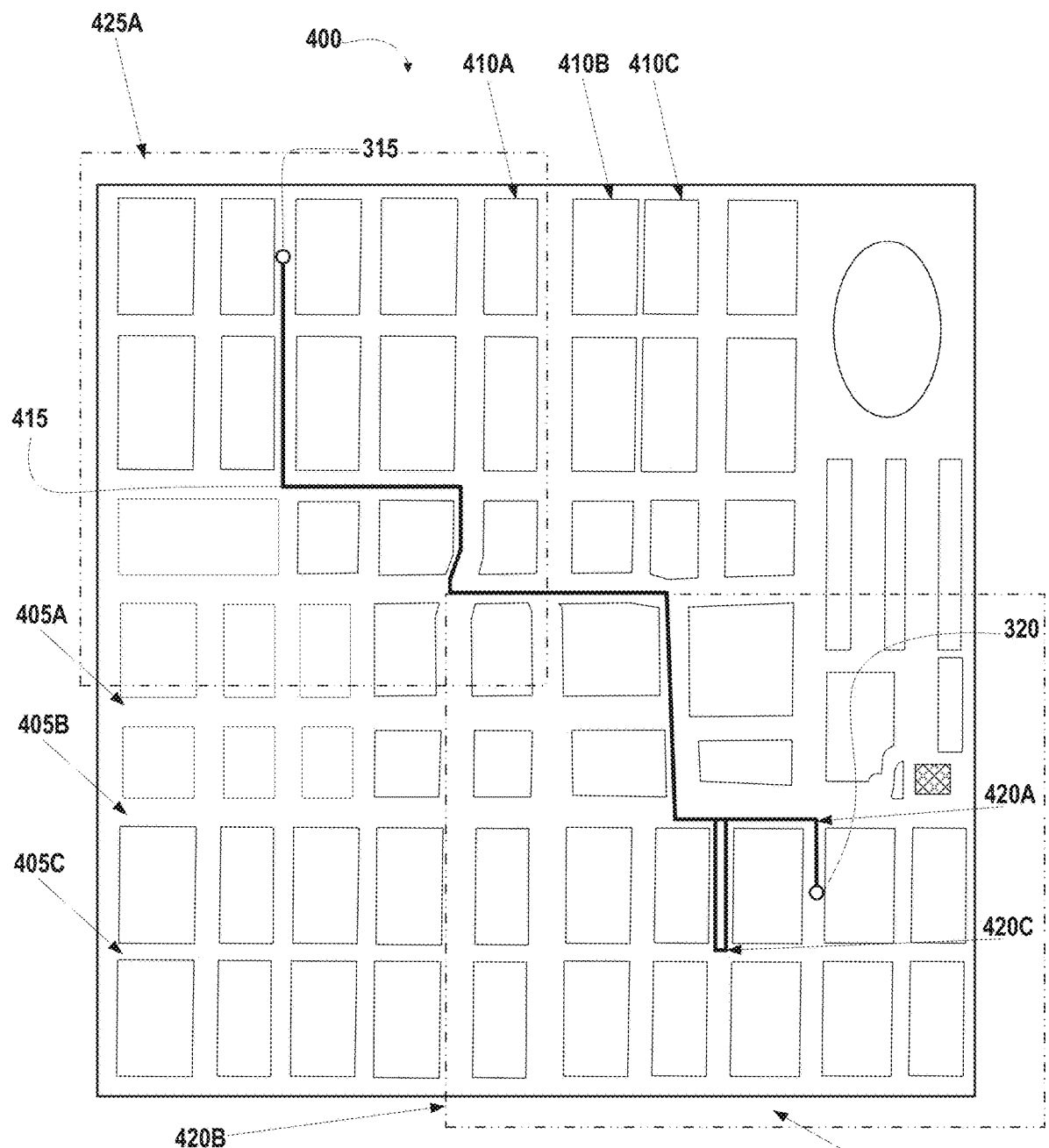
FIG. 4 depicts an example vehicle route for vehicle service request according to example embodiments of the present disclosure.

By way of illustration, FIG. 4 depicts example geographic area(s) 400 with a vehicle route 415 for a vehicle service request according to example embodiments of the present disclosure. The operations computing system 104 (e.g., the routing system back-end) can determine the vehicle route 415 from the start location 315 to the end location 320. For instance, the operations computing system 104 can access map data indicative of the start location 315 and the end location 320. The map data, for example, can include one or more travel ways 405A-405C and/or one or more objects 410A-410C. By way of example, the map data can be indicative of a geographic region 400 including the start location 315 and the end location 320.

The operations computing system 104 can determine the vehicle route 415 based at least in part on the map data. For example, the vehicle route 415 can include one or more directions based at least in part on the map data. The directions, for example, can include one or more vehicle maneuvers 420A, 420B, 420C, etc. For instance, the directions can include one of more driving maneuvers such as a right turn 420A, left turn 420B, U-turn 430C, etc. Moreover, the directions can include one or more geographic areas 425A, 425B in which the vehicle may travel to transport the user and/or items from the start location 315 to the end location 320.

Figure 5:
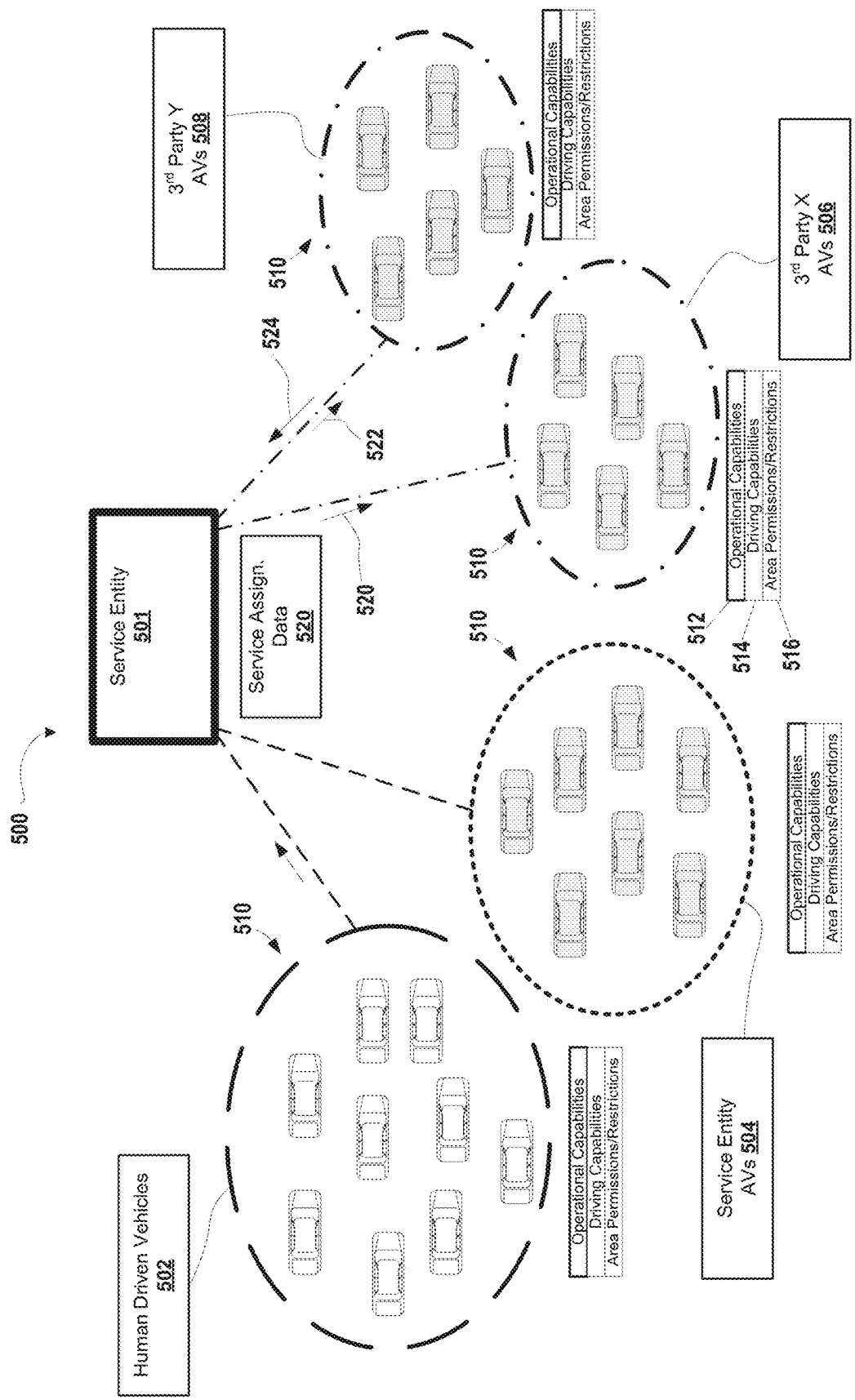
FIG. 5 depicts example types of vehicle service providers according to example embodiments of the present disclosure.

Turning to FIG. 5, FIG. 5 depicts an example system 500 including various types of vehicle service providers according to example embodiments of the present disclosure. For example, the operations computing system 104 can determine how many vehicles 510 may need to be utilized for servicing the service request. For instance, the operations computing system 104 can determine a vehicle route that can be serviced by more than one vehicle 510 in a plurality of vehicles. The plurality of vehicles can include vehicles 510 that are online with a service entity 501 and available to perform a vehicle service, as further described herein.

In some implementations, the vehicles 510 can include human-driven vehicles 502. In some implementations, the vehicles 510 can include autonomous vehicles of the service entity 504 ("first party autonomous vehicles" or "service entity autonomous vehicles"). In some implementations, the vehicles 510 can be autonomous vehicles of a third party vehicle provider 506/508 ("third party autonomous vehicles"). A third party vehicle provider 506/508 can be, for example, a third party vehicle vendor, operator, manager, etc. that owns, operates, manages, etc. a fleet of third party autonomous vehicles. The third party vehicle provider 506/508 can make its fleet (or a portion of its fleet) of third party autonomous vehicles available to the service entity 501 such that the third party autonomous vehicles are available for performing vehicle services (e.g., to address a service request). Each of the one or more vehicle providers can be associated with one or more fleets of vehicles. In some implementations, each respective vehicle 510 in the plurality of vehicles can be associated with at least one of the one or more fleets of vehicles associated with the one or more vehicle providers.

Each vehicle 510 can be associated with a particular fleet of vehicles based on one or more shared attributes such as, for example, a manufacturer of the vehicle (e.g., make, model, etc.), a type of the vehicle (non-autonomous, autonomous, etc.), a vehicle provider, and/or other factors sufficient to separate the plurality of vehicles. For example, in some implementations, each fleet of vehicles can be associated with one or more operational capabilities 512. For example, each of the one or more fleets of vehicles can be associated with a set of operational capabilities. In some implementations, the operational capabilities 512 of each vehicle 510 in a respective fleet of vehicles can correspond to the set of operational capabilities associated with the respective fleet of vehicles. As further described herein, the operational capabilities 512 of a vehicle 510 and/or a fleet can indicate the capabilities (e.g., autonomy capabilities, etc.) the vehicle 510/fleet is able to perform 514, the capabilities the vehicle 510/fleet are unable to perform 514, areas 516 in which the vehicle 510/fleet are able and/or permitted to operate, areas 516 in which the vehicle 510/fleet are unable and/or restricted from operating, etc.

Operational capabilities can include, for example, one or more driving capabilities 514 and/or one or more area permissions 516. The one or more driving capabilities 514, for example, can be indicative of a type of autonomous vehicle and/or a type of driver. For example, the one or more driving capabilities 514 can be indicative of a competence level and/or preference of a driver of a non-autonomous vehicle.

In addition, an autonomous vehicle operational capability can be a feature, function, and/or behavior of the autonomous vehicle. Each of the one or more driving capabilities 514 can be indicative of one or more restricted driving maneuvers the autonomous vehicle is unable to perform and/or one or more autonomous driving maneuvers that autonomous vehicle is able to perform. The operational capabilities 512 can include, for example; speed limits and directions (e.g., conformity to specified speed limits, directions of travel, lane restrictions, etc.); stop and go traffic (e.g., ability to properly handle dense traffic conditions with frequent slow-downs, starts, stops, etc.); turning (e.g., ability to handle left hand turns, unprotected turns, three point turns, U-turns, etc.); parking (e.g., parallel parking, required parking space dimensions, etc.); navigating certain geographic features (e.g., crossing train tracks); traveling in reverse (e.g., backing into a parking space); signaling (e.g., handling turn signal(s) from other objects); nudging (e.g., lateral movement within lane boundaries and/or partially over a lane boundary, etc.); handling jaywalkers; and/or other capabilities of an autonomous vehicle. In some implementations, an operational capability can depend on another operational capability. For example, the autonomous vehicle's ability to handle stop-and-go traffic can depend on its ability to handle speed limits and direction.

The operational capabilities 512 can be included in a pre-defined group (e.g., list, table, etc.) of autonomous vehicle capabilities. For instance, the one or more capabilities can be indicative of a list of capabilities. Each list of capabilities can include one or more maneuvers that the vehicle can safely perform. In some implementations, the absence of a vehicle maneuver from the list of capabilities can be indicative of a restriction. For example, in some implementations, the list of capabilities can be an exhaustive list of driving maneuvers that can be safely performed by a respective vehicle.

In addition, or alternatively, each of the one or more area permissions/restrictions 516 can be indicative of one or more geographic areas in which an autonomous vehicle and/or a non-autonomous vehicle is permitted to travel. For instance, the one or more area permissions 516 can be indicative of autonomous vehicle capabilities such as operating conditions, routes, and/or the like where one or more autonomous vehicles can safely operate. By way of example, the one or more area permissions 516 can be indicative of one or more geographic regions that the autonomous vehicle is mapped to travel within. In some implementations, if an autonomous vehicle does not have access to mapping data describing a geographic region, the autonomous vehicle may not be associated with area permissions 516 indicative of the geographic region.

Figure 6:
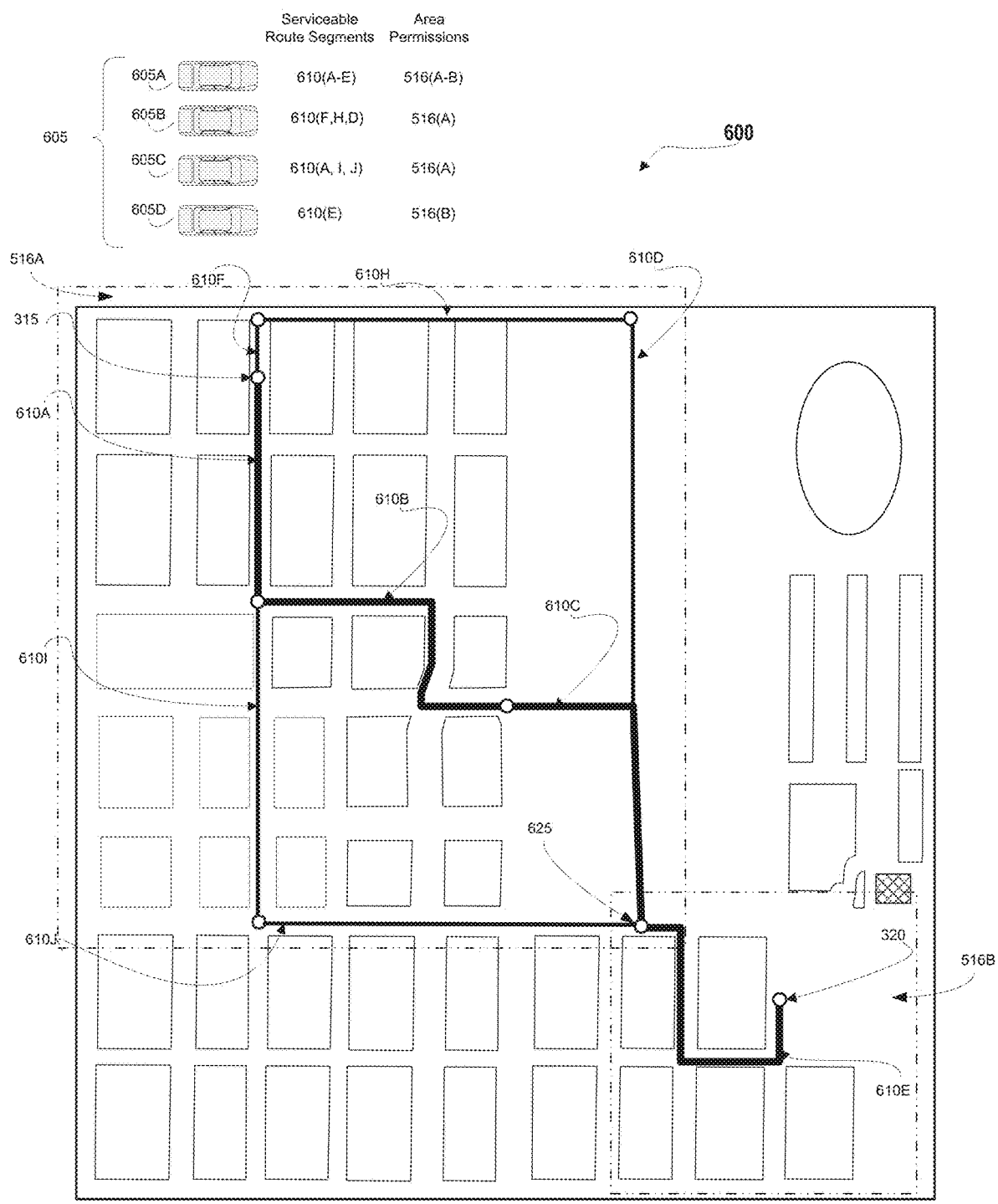
FIG. 6 depicts an example geographic area(s) with vehicle route and ancillary routes for a vehicle service with multiple transfer locations according to example embodiments of the present disclosure.

FIG. 6 depicts an example geographic area(s) 600 including vehicle route and ancillary routes for a vehicle service with multiple transfer locations according to example embodiments of the present disclosure. The operations computing system 104 can determine a number of the plurality of vehicles for the service request by identifying a plurality of candidate vehicles (e.g., candidate vehicles 605) available to complete the service. For example, the operations computing system 104 can identify the plurality of candidate vehicles 605 from a plurality of autonomous vehicles and/or non-autonomous vehicles associated with the one or more vehicle providers. Each candidate vehicle (e.g., candidate vehicles 605A-605D) in the plurality of candidate vehicles 605 can be available to perform at least one portion of the vehicle route. For example, each candidate vehicle can be available and able to perform a vehicle service. This can include being signed online with the service platform of the service entity to be available to receive data for performing a vehicle service and not currently performing a vehicle service (e.g., transporting a user and/or item, etc.) or at least being substantially complete with a current vehicle service such that the vehicle will become available within a reasonable time period for another assignment. In some implementations, the operations computing system 104 can identify the plurality of candidate vehicles based at least in part on a location associated with each of the plurality of vehicles. By way of example, the plurality of candidate vehicles can include a plurality of vehicles within a threshold distance from the start location 315 and/or the end location 320 of a service request.

The operations computing system 104 can segment the vehicle route into one or more route segments (e.g., 610(A-H)) based at least in part on one or more operational capabilities and/or one or more area permissions (e.g., 516(A-B)) associated with each candidate vehicle in the plurality of candidate vehicles. As discussed above, each vehicle in the plurality of vehicles can be associated with one or more operational capabilities and/or area permissions (e.g., 516(A-B)). In this manner, the operations computing system 104 can differentiate between one or more vehicles based on their capabilities and/or permissions. This, in turn, can allow the operations computing system 104 to leverage different types of vehicles to service a wide geographic area. For example, some autonomous vehicles can be configured to offer better types of services such as, urban transportation, interstate transportation, transportation to airports, etc. By way of example, in some implementations, the operations computing system 104 can pool together multiple service requests into a single segmented route that utilizes multiple urban vehicles configured to pool passengers to a joint interstate transportation vehicle (e.g., a fuel efficient hybrid vehicle, etc.). Thus, by segmenting a vehicle route based on the operational capabilities and/or area permissions (e.g., 516(A-B)) of a plurality of candidate vehicles 605, the operations computing system 104 can effectively utilize the computing resources made available by a fleet of vehicles rather than focusing on one vehicle to service an entire route.

The operations computing system 104 can determine the number of vehicles for the service request based on the vehicle route, the one or more operational capabilities associated with each vehicle in the plurality of vehicles, and/or one or more convenience factors associated with at least one user of the service request. For example, the operations computing system 104 can determine the lowest number of candidate vehicles necessary to complete the service request based at least in part on the operational capabilities associated with each of the candidate vehicles.

For example, if one candidate vehicle (e.g., candidate vehicle 605A) can complete every driving maneuver (e.g., U-turn, right turn, etc.) needed to complete the route and is permitted to travel in the area (e.g., urban area, interstate, etc.) through which the route travels, the operations computing system 104 can determine one vehicle for the service request. By way of example, the operations computing system can determine that candidate vehicle 605A can complete the vehicle route by completing route segments 610(A-E). However, in the event that no one vehicle can complete the service request, for example, due to one or more operational constraints, the operations computing system 104 can determine that more than one vehicle can be utilized to complete the service request.

In some implementations, the operations computing system 104 can segment the vehicle route into one or more route segments 610(A-J) based at least in part on one or more convenience factors associated with the service request. The one or more convenience factors, for example, can include one or more criteria that affect the desirability of choosing a travel route such as, for example, a price, a number of transfer locations, a time, a type of vehicle, and/or other factors. The operations computing system 104 can determine the number of vehicles and/or the number of route segments for a service request based at least in part on the one or more convenience factors. By way of example, the operations computing system 104 can compare the one or more convenience factors associated with a route to the one or more user preferences of the service request. The operations computing system 104 can determine the number of vehicles and/or the number of route segments based at least in part on the comparison between the user preferences and the convenience factors associated with the route.

For example, the price charged for a vehicle service request can depend on the number of autonomous vehicles that service the vehicle service request. By way of example, in some scenarios, an autonomous vehicle may be cheaper than a human-driven vehicle (e.g., if the route is unfavorable to a human driver). In another example, one autonomous vehicle (e.g., candidate vehicle 605(A)) may be capable of completing an entire route, however, it may be undesirable (e.g., for the user, for the vehicle, etc.) for the autonomous vehicle to travel from its current location to the starting location of the route (e.g., due to traffic, distance, time, etc.). Thus, segmenting a vehicle route into two route segments serviceable by two autonomous vehicles can be a cost effective option for the user. In this way, the operations computing system 104 can determine a number of vehicles over the bare minimum of vehicles (e.g., based on operational capabilities) to traverse a vehicle route based on convenience factor(s). For example, the operations computing system 104 can determine that two or more vehicles may be utilized to fulfill a service request where one or more operational constraints prevent a single vehicle from fulfilling the service request. In other cases, for example, where one vehicle (e.g., a non-autonomous vehicle, autonomous vehicle, etc.) can fulfill the service request, the operations computing system 104 can nonetheless determine that two vehicles may be advantageous to reduce cost for the user, etc. (e.g., due to unfavorability to the human-driver, inefficiency/location of the one vehicle, etc.)

In some implementations, the operations computing system 104 can determine one or more ancillary vehicle routes for the vehicle route. By way of example, the operations computing system 104 can determine a vehicle route including one or more route segments (e.g., 610A-610E). In addition, the operations computing system 104 can determine one or more ancillary vehicle routes including one or more different route segments. For example, the operations computing system 104 can determine a first ancillary vehicle route including one or more route segments (e.g., 610A, I, J, and E), and a second ancillary vehicle route including one or more different route segments (e.g., 610F, H, D, and E). The operations computing system 104 can determine any number of ancillary routes and each ancillary route can include any combination of different and/or similar route segments for the vehicle route.

More particularly, each ancillary vehicle route can include one or more driving directions from the start location 315 to the end location 320 based, at least in part, on a number of vehicles and/or route segments 610 associated with the ancillary route. For example, the operations computing system 104 can determine the one or more ancillary vehicle routes based at least in part on the vehicle route, the number of vehicles for the service request, the one or more operational capabilities associated with each vehicle in the plurality of candidate vehicles 605 and/or the one or more convenience factors associated with the service request. In some implementations, each ancillary vehicle route can be associated with a different number of vehicles and/or a different number of segments.

By way of example, the operations computing system 104 can determine an ancillary vehicle route for every combination of vehicles capable (e.g., based on operational capabilities) of completing the vehicle service requests. In this manner, the operations computing system can provide a user with one or more options for completing the service request. By way of example, candidate vehicle 605A can complete the vehicle route; candidate vehicles 605B and 605D can complete the first ancillary vehicle route; and candidate vehicles 605C-D can complete the second ancillary vehicle route. Each ancillary vehicle route can include one or more convenience factors, such as time, price, etc. In some implementations, the operations computing system 104 can allow a user to select a number of vehicles and/or route segments based on the one or more convenience factors associated with the corresponding ancillary vehicle route.

The operations computing system 104 can determine one or more transfer locations 625 for the vehicle route and/or one or more ancillary vehicle routes. For example, the operations computing system can determine one or more transfer locations 625 for a route (e.g., vehicle route, ancillary vehicle route, etc.) associated with two or more of the plurality of candidate vehicles. By way of example, a transfer location can allow a user and/or item to transfer from one vehicle to another. Thus, each transfer location in the one or more transfer locations 625 can be associated with at least two vehicles in the plurality of vehicles in so far as each transfer location can be proximate to an area reachable by at least two vehicles.

The transfer location(s) 625 for a vehicle service can be based at least in part on the start location 315 and the end location 320 associated with the service request. In some implementations, the operations computing system 104 can identify one or more candidate locations in between and/or proximate to the start location 315 and/or the end location 320. The operations computing system 104 can select the transfer location(s) 625 from the candidate location(s). For example, the operations computing system 104 can obtain information regarding candidate locations in a geographic area that includes the start location 315 and/or end location 320 (e.g., from a location database). The operations computing system 104 can select transfer location(s) 625 from the candidate location(s) by filtering the candidate location(s) based on one or more convenience factors and/or one or more operational capabilities.

By way of example, the operations computing system 104 can determine the one or more transfer locations 625 for a route (e.g., vehicle route, ancillary vehicle route, etc.) based on the one or more operational capabilities associated with each candidate vehicle in the plurality of candidate vehicles 605. The operations computing system 104 can filter the candidate locations based on the number of vehicles available to service the candidate location due to operational capabilities. The availability of vehicles to service a particular candidate location can be limited by operational restrictions. By way of example, a candidate location in a particular urban area may only be serviceable by a small subset of the plurality of candidate vehicles (e.g., non-autonomous vehicles, autonomous vehicles mapped to the particular urban area, etc.), whereas a candidate location located off the interstate may be serviceable by a larger subset of the plurality of candidate vehicles (e.g., non-autonomous vehicles, interstate trained autonomous vehicles, etc.). Thus, the operations computing system 104 can determine the one or more transfer locations 625 based on vehicle availability due to operational constraints. In addition, or alternatively, the operations computing system 104 can determine the one or more transfer locations 625 for a route (e.g., vehicle route, ancillary vehicle route, etc.) based on the one or more convenience factors associated with the service request. For example, the operations computing system 104 can filter the candidate locations by convenience factors, such as ease of access, number of incident reports, amenities (e.g., reserved parking or staging areas), detour distance, time value, and vehicle availability.

In some implementations, the operations computing system 104 can score the candidate location(s) based the one or more operational capabilities and the one or more convenience factors. The operations computing system 104 can select the transfer location(s) 625 from the candidate location(s) based at least in part on the score. As an example, a candidate location nearby a well-maintained existing infrastructure (e.g., roads, wireless coverage, etc.) can be scored higher than a remote candidate location with poor access. As another example, a candidate location with fewer incident reports (e.g., police reports, insurance claims, etc.) than other candidate locations can be scored higher than the other candidate locations. As another example, a candidate location with more amenities or higher-valued amenities than other candidate locations can be scored higher than the other candidate locations. As another example, a candidate location having a shorter detour distance than other candidate locations with respect to a route for the vehicle service can be scored higher than the other candidate location(s). As another example, if a route that includes a candidate location is associated with a shorter completion time than a route that does not include the candidate location (a positive time value), then the candidate location can be scored higher than other candidate locations. Conversely, in the event a route that includes a candidate location is associated with a longer completion time than a route that does not include the candidate location (a negative time value), then the candidate location can be scored lower than other candidate locations. As another example, the candidate location can be scored lower than other candidate locations in the event that there are no available vehicles that can arrive at the candidate location within a predetermined window of a user's arrival (e.g., due to operational constraints).

In some implementations, the operations computing system 104 can segment the route (e.g., vehicle route, the one or more ancillary vehicle routes, etc.) into one or more route segments 610(A-J) based at least in part on the one or more transfer locations 625. Each route segment can be serviceable by at least one candidate vehicle in the plurality of candidate vehicles 605. Thus, the operations computing system can segment the route (e.g., vehicle route, the one or more ancillary vehicle routes, etc.) such that the number of segments match the number of vehicles determined for the route (e.g., vehicle route, the one or more ancillary vehicle routes, etc.). By way of example, each route segment can include a segment start location, a segment end location, and a first and second leg. The segment start and segment end location can include a transfer location 625 and/or the start 315 or end 320 location associated with the service request. The first leg can be indicative of the path from the vehicle's current location to the segment start location. The second leg can be indicative of the path from the segment start location to the segment end location.

The operations computing system 104 can assign at least two candidate vehicles to perform the vehicle service by assigning at least one of the route segment(s) 610(A-J) to each of the at least two candidate vehicles. The operations computing system 104 can assign a candidate vehicle (of the at least two) to a particular route segment based on the operational capabilities associated with the respective candidate vehicle. For example, the operations computing system 104 can assign a first candidate vehicle to a first route segment based on a first set of operational capabilities associated with the first candidate vehicle. In addition, or alternatively, the operations computing system 104 can assign a second candidate vehicle to a second route segment based on a second set of operational capabilities associated with the second candidate vehicle.

As discussed above, each route segment can include two legs. Thus, in some implementations, the operations computing system 104 can determine that the first candidate vehicle is capable of servicing the at least two legs of the route segment based at least in part on the first set of operational capabilities. For example, the operations computing system 104 can determine that the operational capabilities of the first candidate vehicle are sufficient to reach the segment start location of the first route segment from the first candidate vehicle's current location and the segment end location of the first route segment from the segment start location of the first route segment. As another example, the operations computing system 104 can determine that the second candidate vehicle is capable of servicing the at least two legs of the second route segment based at least in part on the second set of operational capabilities. For example, the operations computing system 104 can determine that the operational capabilities of the second candidate vehicle are sufficient to reach the segment start location of the second route segment from the second candidate vehicle's current location and the segment end location of the second route segment from the segment start location of the second route segment. In some implementations, the first candidate vehicle can be included in a first fleet of autonomous vehicles of a first vehicle provider (e.g., a third party autonomous vehicle of a first vehicle vendor). Additionally, the second candidate vehicle can be included in a second fleet of autonomous vehicles of a second vehicle provider (e.g., a third party autonomous vehicle of a second vehicle vendor).

Figure 7:
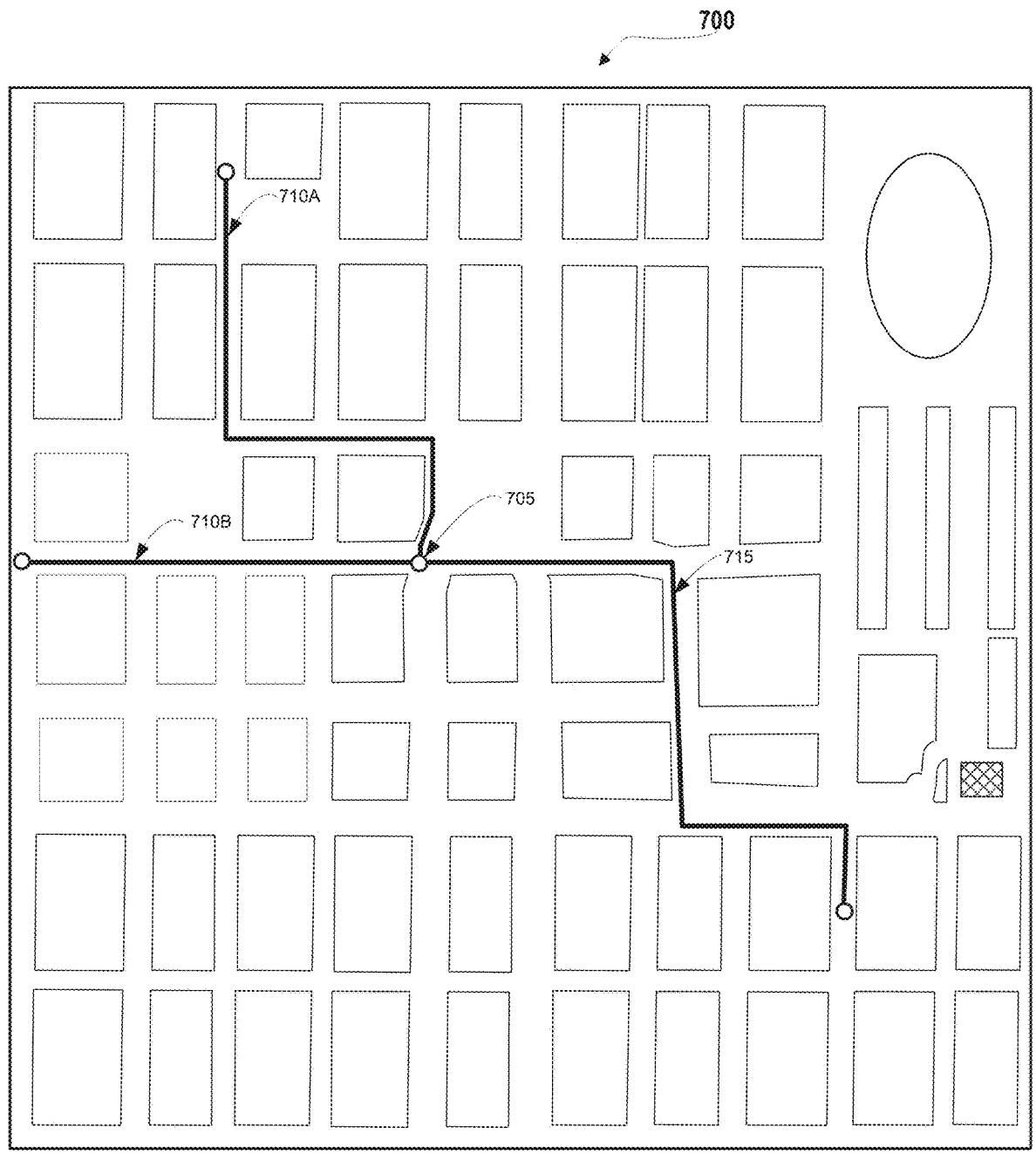
FIG. 7 depicts example geographic area(s) with vehicle routes including multiple common transfer locations according to example embodiments of the present disclosure.

FIG. 7 depicts example example geographic area(s) 700 with vehicle routes including multiple common transfer locations according to example embodiments of the present disclosure. In some implementations, a transfer location can be associated with a plurality of service requests. For example, in some implementations, the operations computing system 104 can determine a common transfer location 705 for a route (e.g., vehicle route, ancillary vehicle route, etc.) such that it coincides with an arrival of a plurality of users at the common transfer location 705. By way of example, the operations computing system 104 can receive a plurality of separate service requests for a vehicle service from a plurality of users 710. The operations computing system 104 can determine a plurality of routes 710A-B (e.g., vehicle route, ancillary vehicle route, etc.) based on the plurality of service requests. For example, the operations computing system 104 can determine at least one route (e.g., vehicle route, ancillary vehicle route, etc.) for each service request in the plurality of service requests. The operations computing system 104 can determine one or more candidate locations for each route (e.g., vehicle route, ancillary vehicle route, etc.) in the plurality of routes. In some implementations, the operations computing system 104 can determine a candidate location common to one or more routes (e.g., vehicle route, ancillary vehicle route, etc.) in the plurality of routes 710A-B. The operations computing system 104 can determine a common transfer location 705 for each of the one or more routes (e.g., vehicle route, ancillary vehicle route, etc.) based on the candidate location common to the one or more routes. In this manner, the operations computing system 104 can determine a common transfer location 705 for a plurality of service requests that share a portion of a route 715 (e.g., vehicle route, ancillary vehicle route, etc.).

In some implementations, the operations computing system 104 can pool one or more candidate vehicles together to service a plurality of routes associated with a plurality of separate service requests. For example, the operations computing system 104 can determine one or more common route segments 715 for the plurality of routes 710A-B based on a common transfer location 705 associated with each route (e.g., vehicle route, ancillary vehicle route, etc.) in the plurality of routes 710A-B. By way of example, the operations computing system 104 can determine a separate first route segment for each route (e.g., vehicle route, ancillary vehicle route, etc.) in the plurality of routes 710A-B. In addition, the operations computing system 104 can determine a common second route segment 715 shared by each route (e.g., vehicle route, ancillary vehicle route, etc.) in the plurality of routes 710A-B. The operations computing system 104 can determine a first vehicle to service each of the separate first route segments associated with each route (e.g., vehicle route, ancillary vehicle route, etc.) in the plurality of routes (e.g., vehicle route, ancillary vehicle route, etc.). The operations computing system 104 can determine one common second vehicle to service the common second route segment 705 shared by each route (e.g., vehicle route, ancillary vehicle route, etc.) in the plurality of routes. In this manner, a plurality of users associated with separate vehicle service requests can be pooled into the same common second vehicle. For example, users from all over a certain neighborhood can be pooled into an autonomous vehicle for highway travel to the city and then dispersed into a first autonomous vehicle for another transfer location, a final destination, etc.

Figure 8:
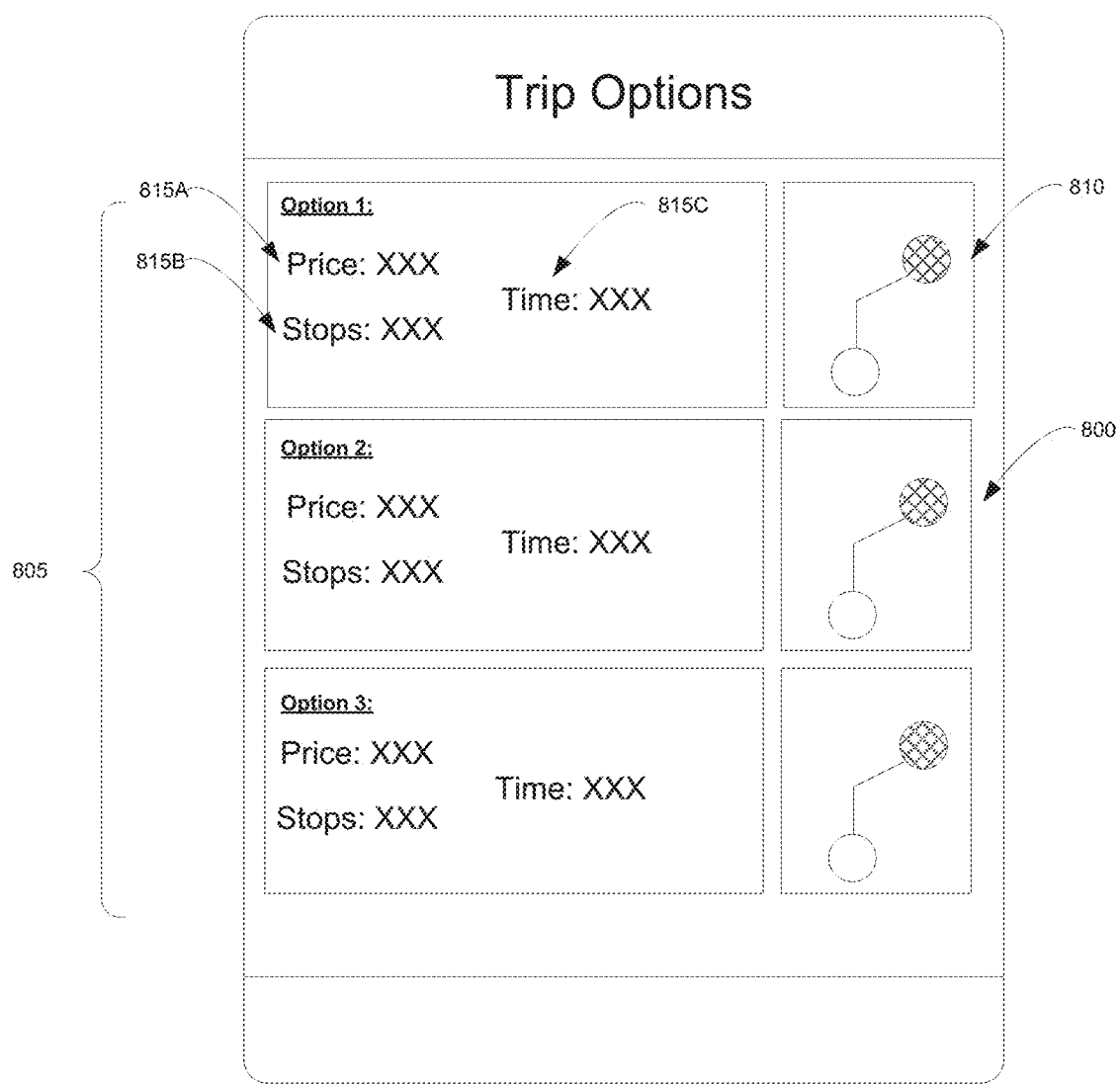
FIG. 8 depicts an example user interface according to example embodiments of the present disclosure.

FIG. 8 depicts an example user interface 800 according to example embodiments of the present disclosure. The user interface 800 can be presented via a display device (e.g., display screen) on a user device (e.g., phone), as shown for example in FIG. 8. The operations computing system 104 can provide transit data indicative of the vehicle route, the number of vehicles for the route, and/or the one or more segments of the vehicle route to a user. For example, the operations computing system 104 can provide the transit data to the user via user device (e.g., laptop, smartphone, or other computing device). For example, the transit data can include a virtual representation of the vehicle route 810, an indication of one or more transfer locations (e.g., stops 815B) and/or segments associated with the route, an indication of the one or more vehicles assigned to service the route, a price 815A, a time 815C, and/or other information relevant to the service request.

In some implementations, the operations computing system 104 can, in response to receiving the service request for a vehicle service for a user, provide data indicative of the vehicle route and one or more ancillary vehicle routes to the user. For example, the operations computing system 104 can provide one or more options 805 to the user. Each option can include an ancillary vehicle route and transit data corresponding to the ancillary vehicle route. For example, each option can include a virtual representation of the ancillary vehicle route 810 and one or more convenience factors (e.g., price 815A, number of stops 815B, time 815C, etc.) associated with the ancillary vehicle route. In this manner, the user can select a vehicle route based on one or more convenience factors associated with the ancillary route (e.g., time 815C, price 815B, number of transfer locations 815A, etc.) and/or one or more user preferences for the trip.

Returning to FIG. 5, the operations computing system 104 can generate data 520 indicative of a service assignment based at least in part on the service request and the selected candidate vehicles. For example, the operations computing system 104 can generate a first service assignment for a first candidate vehicle that is indicative of a first vehicle route segment (that can be traversed by the first candidate vehicle based on its operational capabilities), a starting location, transfer location, ending location, type of service, timing constraints, user preferences, etc. The operations computing system 104 can generate a second service assignment for a second candidate vehicle that is indicative of a second vehicle route segment (that can be traversed by the second candidate vehicle based on its operational capabilities), a starting location, transfer location, ending location, type of service, timing constraints, user preferences, etc. The first and second service assignments can both be associated with the same service request and be for providing a vehicle service to the same user(s). The operations computing system 104 can communicate data associated with the service request for the at least two candidate vehicles. Data sent for the candidate vehicles can be sent directly to the candidate vehicles and/or to a remote computing system that is associated with the respective candidate vehicle and remote from the candidate vehicle. For example, the operations computing system 104 can communicate data 520 indicative of the first route segment (e.g., the first service assignment) for the first candidate vehicle (e.g., to the first candidate vehicle, to an offboard system associated therewith, etc.) and data 522 indicative of the second route segment (e.g., the second service assignment) to the second candidate vehicle (e.g., to the second candidate vehicle, to an offboard system associated therewith, etc.). The data indicative of the service request can include a request and/or a command for the candidate vehicle to service a particular segment of the route (e.g., vehicle route, one or more ancillary route, etc.). For example, the data indicative of the service request can include a request for a third party vehicle (e.g., vehicles owned by a third party service provider, etc.) to service the request. In another example, the data indicative of the route (e.g., vehicle route, one or more ancillary, etc.) can include a command for a first party vehicle operated by the service entity to service the request.

The operations computing system 104 of the service entity 501 can obtain data 524 indicative of an acceptance or rejection of the service assignment. In the event a service assignment is rejected, the operations computing system 104 can select another candidate vehicle to service the rejected route segment and/or determine one or more new route segments (e.g., for a previously selected candidate vehicle or a new candidate vehicle).

By way of example, the operations computing system 104 can obtain data indicative of a rejection of the second route segment/second vehicle service assignment (e.g., from the second candidate autonomous vehicle, from a vehicle provider computing system, etc.). In some implementations, the operations computing system 104 can select another candidate autonomous vehicle for the second route segment. For instance, the operations computing system can analyze the operational capabilities of a third candidate autonomous vehicle to determine whether the third candidate autonomous vehicle can traverse the second route segment (that was rejected for the second candidate autonomous vehicle). In the event the third candidate autonomous vehicle is determined to be able to traverse the second route segment, the operations computing system can select the third autonomous vehicle and communicate data indicative of the second route segment (e.g., second service assignment) for the third candidate autonomous vehicle.

Additionally, or alternatively, the operations computing system 104 can perform another segmenting of the route based at least in part on the rejection. For example, the operations computing system can determine that another candidate autonomous vehicle (e.g., the third autonomous vehicle) cannot traverse the second route segment based at least in part on the operational capabilities of the third autonomous vehicle or determine that it would not be appropriate for the third candidate autonomous vehicle to do so (e.g., because of its location, traffic, etc.). The operations computing system 104 can perform another segmenting process of the route to segment the route into two or more new segments that are different than the first and second route segment. The operations computing system 104 can select two or more autonomous vehicles for these two or more new route segments. The selected autonomous vehicle(s) may or may not include the first candidate autonomous vehicle (that previously accepted the first route segment) and/or a third candidate autonomous vehicle. In the event that the route is re-segmented, the operations computing system 104 can cancel the first service assignment communicated to the first candidate autonomous vehicle. The operations computing system 104 can repeat this process until all the route segments are accepted by candidate autonomous vehicles (so that the entire route can be completed). In some implementations, the operations computing system 104 can select a candidate autonomous vehicle for a second route segment after another autonomous vehicle has accepted and begun to traverse the first route segment. In some implementations, the operations computing system 104 can maintain the first route segment and then break the second route segment (the rejected one) into one or more sub-segments and select candidate autonomous vehicle(s) to service those segments (e.g., based at least in part on the operational capabilities of those autonomous vehicles). In the event the number of transfer locations changes, the user(s) may be provided a discount, incentive, etc.

Figure 9:
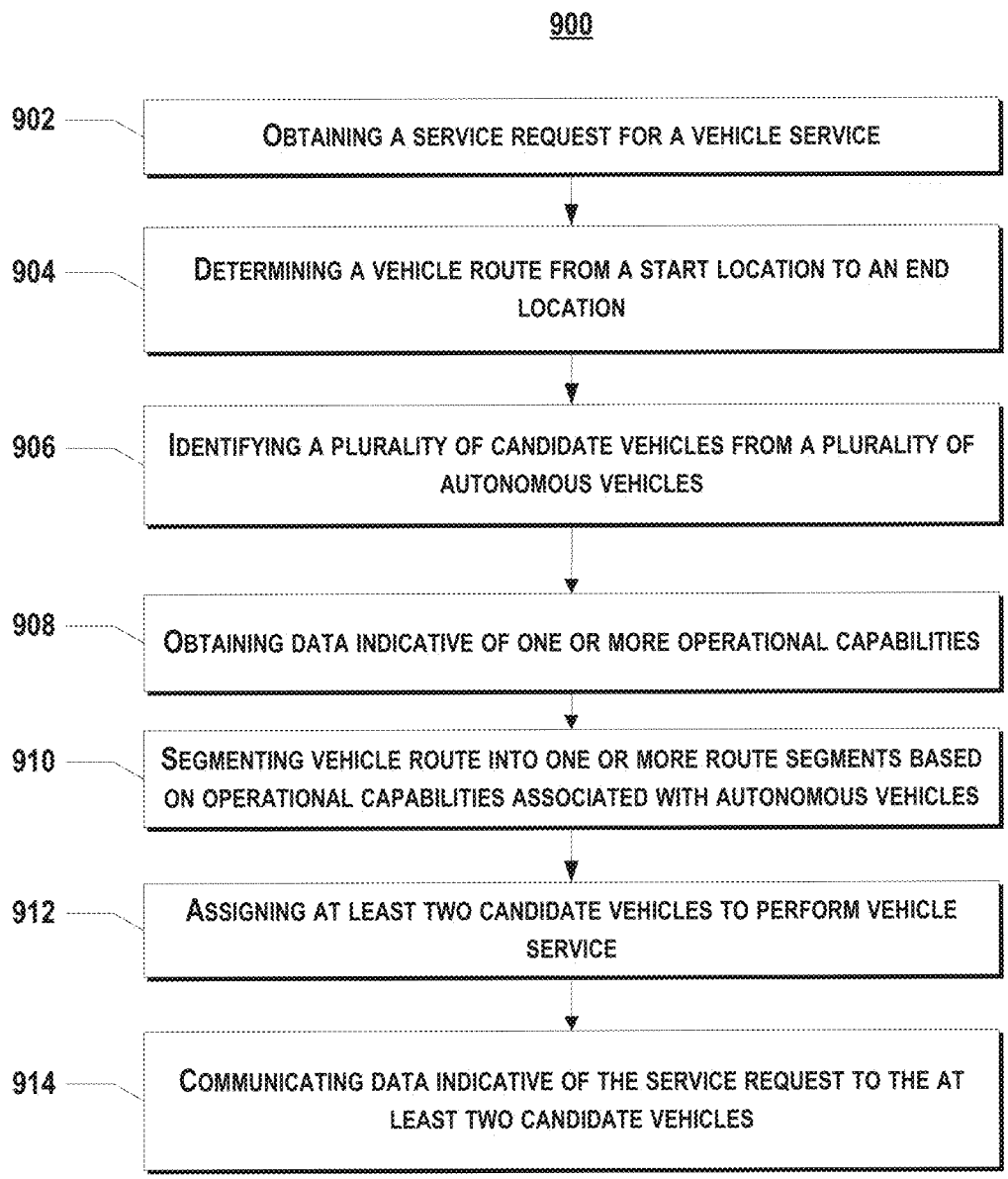
FIG. 9 depicts a flow diagram of an example method for performing allocation of vehicle service assignments according to example embodiments of the present disclosure.

FIG. 9 depicts an example flow diagram of an example method 900 for autonomous vehicle motion planning according to example implementations of the present disclosure. One or more portion(s) of the method 900 can be implemented by a computing system that includes one or more computing devices such as, for example, the computing systems described with reference to the other figures (e.g., the vehicle computing system 112, the operations computing system 104, etc.). Each respective portion of the method 900 can be performed by any (or any combination) of one or more computing devices. Moreover, one or more portion(s) of the method 900 can be implemented as an algorithm on the hardware components of the device(s) described herein (e.g., as in FIGS. 1-2, 10-11, etc.), for example, to coordinate the provision of vehicle services. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 9 is described with reference to elements/terms described with respect to other systems and figures for exemplary illustrated purposes and is not meant to be limiting. One or more portions of method 900 can be performed additionally, or alternatively, by other systems.

At (902), the method 900 can include obtaining a service request for a vehicle service. For example, the operations computing system can receive a service request for a vehicle service. The service request, for example, can include a start location and an end location. In addition, or alternatively, the service request can include one or more user preferences, projected route features, and/or other information, for example, as described herein.

At (904), the method 900 can include determining a vehicle route from a start location to an end location. For example, the operations computing system can determine a vehicle route from the start location to the end location. The vehicle route can include one or more directions (e.g., driving, aerial, etc.) to enable a vehicle to travel from the start location to the end location.

At (906), the method 900 can include identifying a plurality of candidate vehicles from a plurality of vehicles. For example, the operations computing system can identify a plurality of candidate vehicles from a plurality of autonomous vehicles. In some implementations, each autonomous vehicle in the plurality of autonomous vehicles can be a third party autonomous vehicle. For example, in some implementations, a first candidate vehicle can be included in a first fleet of autonomous vehicles of a first vehicle provider and a second candidate vehicle can be included in a second fleet of autonomous vehicles of a second vehicle provider. The first fleet of autonomous vehicles can be different than the second fleet of autonomous vehicles. Each candidate vehicle in the plurality of candidate vehicles can be able to perform at least one portion of the vehicle route.

At (908), the method 900 can include obtaining data indicative of one or more operational capabilities. For example, the operations computing system can obtain data indicative of one or more operational capabilities for each candidate vehicle in the plurality of autonomous vehicles. In some implementations, the operations computing system can obtain data indicative of a first set of operational capabilities associated with a first candidate vehicle and data indicative of second set of operational capabilities associated with a second candidate vehicle.

The operational capabilities associated with each of the plurality of autonomous vehicles can include one or more driving capabilities and/or area permissions. The one or more driving capabilities can be indicative of one or more restricted driving maneuvers the autonomous vehicle is unable to perform and/or one or more autonomous driving maneuvers the autonomous vehicle is able to perform. The one or more area permissions can be indicative of one or more geographic areas in which the autonomous vehicle is permitted to travel.

At (910), the method 900 can include segmenting the vehicle route into one or more route segments based on operational capabilities associated with autonomous vehicles. For example, the operations computing system can segment the vehicle route into one or more route segments based on the one or more operational capabilities associated with each autonomous vehicle in the plurality of autonomous vehicles. In addition, or alternatively, the one or more route segments can be based, at least in part, on the one or more convenience factors associated with the service request. For example, the one or more convenience factors can include one or more of a price, number of transfer locations, and/or a time.

In some implementations, the operations computing system can determine one or more transfer locations for the vehicle route based, at least in part, on the one or more operational capabilities associated with each candidate vehicle in the plurality of candidate vehicles. In addition, in some implementations, the operations computing system can determine the one or more transfer locations for the vehicle route based, at least in part, on the one or more convenience factors associated with the service request and the one or more operational capabilities associated each vehicle in the plurality of vehicles. In some implementations, the operations computing system can segment the vehicle route into the one or more route segments based, at least in part, on the one or more transfer locations.

In some implementations, the operations computing system can receive a plurality of second service requests for a plurality of second vehicle services. In such a case, the operations computing system can determine a common transfer location for the vehicle route based, at least in part, on the plurality of second service requests. In addition, the operations computing system can determine a common route segment associated with each second service request in the plurality of second service requests based, at least in part, on the common transfer location.

In some implementations, the operations computing system can determine one or more ancillary vehicle routes based on the vehicle route, a number of vehicles assigned for the service request, and the one or more convenience factors associated with the service request. For example, each of the one or more ancillary vehicle routes can be associated with a different number of vehicles. Each of the one or more ancillary vehicle routes can include one or more route segments based, at least in part, on the different number of vehicles.

At (912), the method 900 can include assigning at least two candidate vehicles to perform the vehicle service. For example, the operations computing system can assign at least two candidate vehicles to perform the vehicle service by assigning at least one of the one or more route segments to each of the at least two candidate vehicles. For example, the operations computing system can assign the first candidate vehicle to a first route segment based, at least in part, on the first set of operational capabilities associated with the first candidate vehicle. In addition, the operational computing system can assign the second candidate vehicle to a second route segment based, at least in part, on the second set of operational capabilities associated with the second candidate vehicle. In the event that the one or more route segments include a common route segment, the operations computing system can assign a common autonomous vehicle to the common route segment.

By way of example, each of the one or more route segments can be indicative of at least two legs. In such a case, the operations computing system can determine that the first candidate vehicle is capable of servicing the at least two legs of the first route segment based, at least in part, on the first set of operational capabilities. In addition, the operations computing system can determine that the second candidate vehicle is capable of servicing the at least two legs of the second route segment based, at least in part, on the second set of operational capabilities.

In some implementations, at least one of the candidate vehicles assigned to perform the vehicle service can be included in a first autonomous vehicle fleet of a first vehicle provider. In addition, at least one of the candidate vehicles assigned to perform the vehicle service can be included in a second autonomous vehicle fleet of a second vehicle provider. For example, the first fleet of autonomous vehicles can be associated with a first set of operational capabilities. In addition, the second fleet of autonomous vehicle can be associated with a second set of operational capabilities. In some implementations, at least a subset of the first set of operational capabilities can be different than at least a subset of the second set of operational capabilities.

At (914), the method 900 can include communicating data indicative of the service request to the at least two candidate vehicles. For example, the operations computing system can communicate data indicative of the service request to the at least two candidate vehicles. By way of example, the operations computing system can communicate data indicative of the first route segment for the first candidate vehicle. In addition, or alternatively, the operations computing system can communicate data indicative of the second route segment for the second candidate vehicle. For example, the operations computing system can provide data indicative of the vehicle route, a number of vehicles for the vehicle route, and/or the one or more segments of the vehicle route to a user. In the event that the operations computing system determines one or more ancillary vehicle routes, the system can provide data indicative of the vehicle route and the one or more ancillary vehicle routes to the user.

Figure 10:
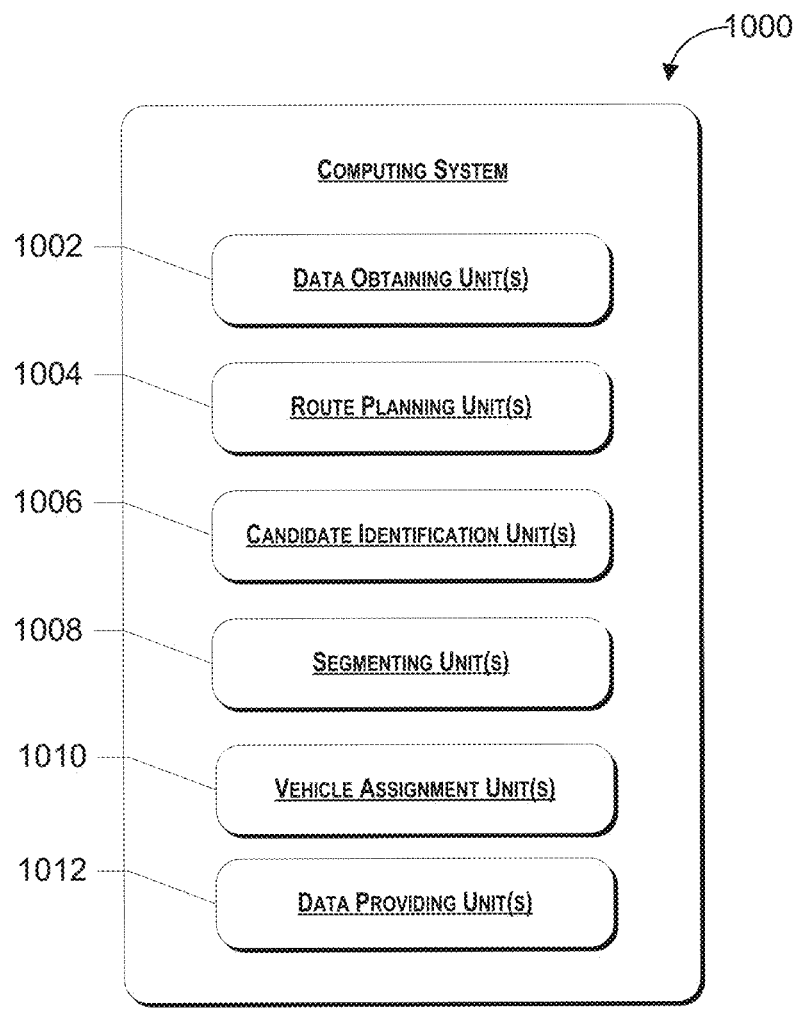
FIG. 10 depicts example units associated with a computing system for performing operations and functions according to example embodiments of the present disclosure.

Various means can be configured to perform the methods and processes described herein. For example, FIG. 10 depicts an example system 1000 that includes various means according to example embodiments of the present disclosure. The computing system 1000 can be and/or otherwise include, for example, an operations computing system, deployment system (backend service), etc. The computing system 1000 can include data obtaining unit(s) 1002, route planning unit(s) 1004, candidate identification unit(s) 1006, segmenting unit(s) 1008, vehicle assignment unit(s) 1010, data providing unit(s) 1012, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., data obtaining unit(s) 1002, etc.) can be configured to obtain data representing one or more service requests. For example, each service request can be associated with a vehicle service for a user and can include a start location and an end location. In addition, in some implementations, the means (e.g., the data obtaining unit(s) 1002, etc.) can obtain vehicle data indicative of one or more operational capabilities associated with a plurality of vehicle and map data indicative of one or more geographic areas.

In addition, the means (e.g., route planning unit(s) 1004, etc.) can be configured to determine a vehicle route from the start location to the end location associated with a service request. For example, the means (e.g., route planning unit(s) 1004, etc.) can determine the vehicle route based on map data indicative of one or more geographic areas including the start location and the end location of the service request. The vehicle route, for example, can include driving directions sufficient to direct a vehicle from the start location to the end location.

In addition, the means (e.g., candidate identification unit(s) 1006, etc.) can be configured to identify a plurality of candidate vehicles from a plurality of autonomous vehicles. For example, the plurality of candidate vehicles can be available to perform at least one portion of the vehicle route. By way of example, the plurality of candidate vehicle can include a subset of a plurality of autonomous vehicles close enough to service a portion of the vehicle route.

In addition, the means (e.g., segmentation unit(s) 1008, etc.) can be configured to segment the vehicle route into one or more route segments based on one or more operational capabilities associated with each autonomous vehicle in the plurality of autonomous vehicles. In addition, or alternatively, the means (e.g., segmentation unit(s) 1008, etc.) can be configured to segment the vehicle route into one or more route segments based on one or more convenience factors associated with the service request. In some implementations, the means (e.g., segmentation unit(s) 1008, etc.) can be configured to generate one or more ancillary routes. Each ancillary route, for example, can include a different number of segments. The one or more ancillary routes can be generated based on the convenience factors associated with the service request.

In addition, the means (e.g., vehicle assignment unit(s) 1010, etc.) can be configured to assign at least two candidate vehicles to perform the vehicle service. For example, the means (e.g., vehicle assignment unit(s) 1010, etc.) can assign the candidate vehicles by assigning at least one of the one or more route segments to each of the at least two candidate vehicles. By way of example, the (e.g., vehicle assignment unit(s) 1010, etc.) can be configured to determine that a candidate vehicle is capable of servicing a particular segment of the vehicle route. The means (e.g., vehicle assignment unit(s) 1010, etc.) can assign a candidate vehicle to a particular route segment based on such a determination.

In addition, the means (e.g., data providing unit(s) 1012, etc.) can be configured to communicate data indicative of the service request to the at least two candidate vehicles. For example, the means (e.g., data providing unit(s) 1012, etc.) can communicate data indicative of a request and/or a command for a candidate vehicle to service at least one segment of the vehicle route. In addition, or alternatively, the means (e.g., data providing unit(s) 1012, etc.) can be configured to provide transit data indicative of the service request to a user of a user device. In this manner, the means (e.g., data providing unit(s) 1012, etc.) can inform a user of one or more segments and/or candidate vehicle determined for the vehicle route.

These described functions of the means are provided as examples and are not meant to be limiting. The means can be configured for performing any of the operations and functions described herein.

Figure 11:
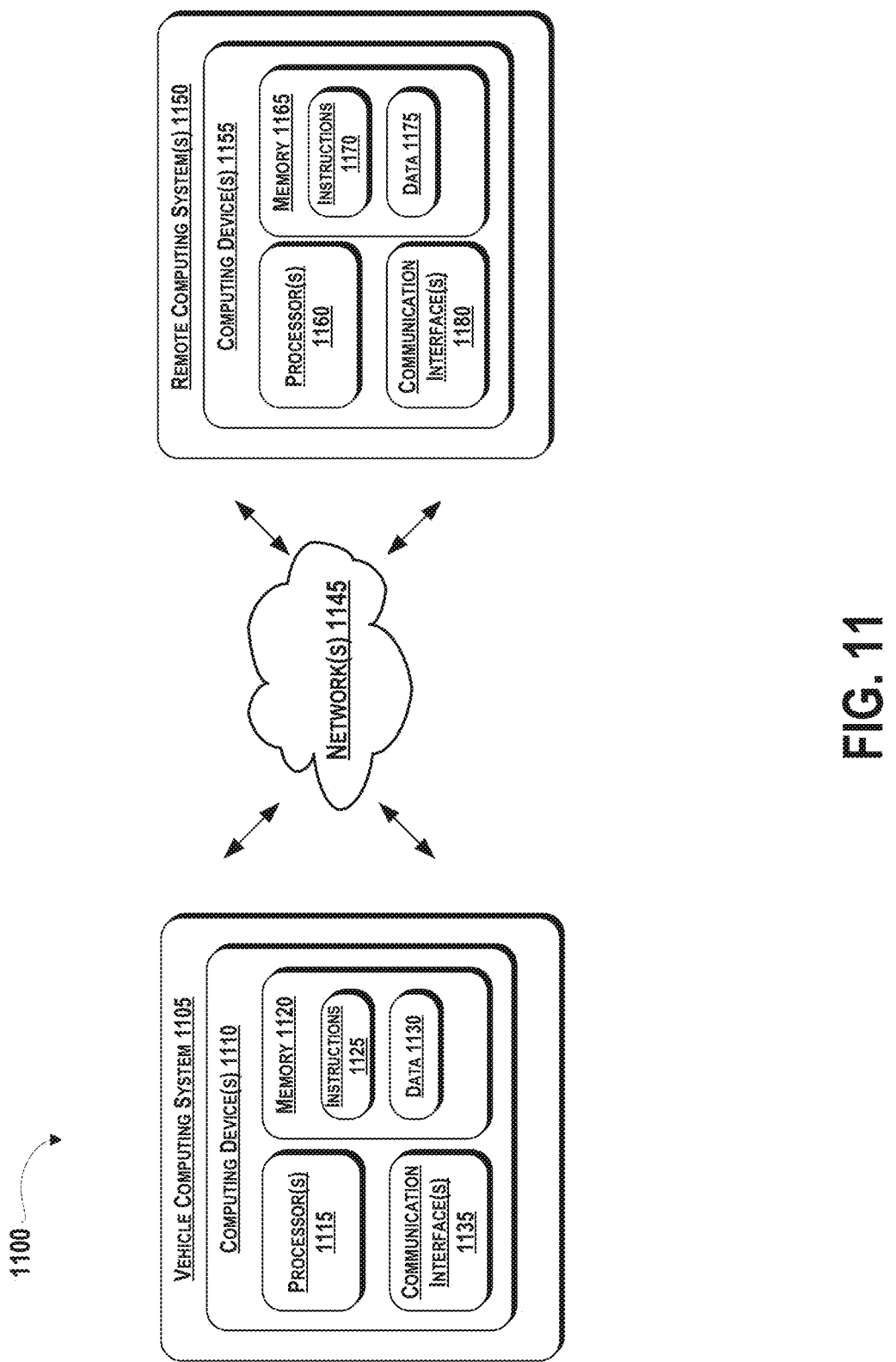
FIG. 11 depicts a block diagram of an example computing system according to example embodiments of the present disclosure.

FIG. 11 depicts example system components of an example system 1100 according to example implementations of the present disclosure. The example system 1100 illustrated in FIG. 11 is provided as an example only. The components, systems, connections, and/or other aspects illustrated in FIG. 11 are optional and are provided as examples of what is possible, but not required, to implement the present disclosure. The example system 1100 can include a vehicle computing system 1105 (e.g., vehicle computing system 112, etc.) and a remote computing system 1150 (e.g., operations computing system 104, remote computing device(s) 106, etc.) that are communicatively coupled over one or more network(s) 1145 (e.g., network 108, etc.). As described herein, the vehicle computing system 1105 can be implemented onboard a vehicle (e.g., as a portion of the vehicle computing system 112) and/or can be remote from a vehicle (e.g., as a portion of an operations computing system 104, one or more remote computing devices(s) 106 etc.).

The vehicle computing system 1105 can include one or computing device(s) 1110. The computing device(s) 1110 of the vehicle computing system 1105 can include processor(s) 1115 and a memory 1120. The one or more processor(s) 1115 can be any suitable processing device (e.g., a processor core, a microprocessor, an ASIC, a FPGA, a controller, a microcontroller, etc.) and can be one processor or a plurality of processors that are operatively connected. The memory 1120 can include one or more non-transitory computer-readable storage media, such as RAM, ROM, EEPROM, EPROM, one or more memory devices, flash memory devices, etc., and/or combinations thereof.

The memory 1120 can store information that can be obtained by the one or more processor(s) 1115. For instance, the memory 1120 (e.g., one or more non-transitory computer-readable storage mediums, memory devices, etc.) can include computer-readable instructions 1125 that can be executed by the one or more processor(s) 1115. The instructions 1125 can be software written in any suitable programming language or can be implemented in hardware. Additionally, or alternatively, the instructions 1125 can be executed in logically and/or virtually separate threads on processor(s) 1115.

For example, the memory 1120 can store instructions 1125 that when executed by the one or more processor(s) 1115 cause the one or more processor(s) 1115 (e.g., of the vehicle computing system 112) to perform operations such as any of the operations and functions of the operations computing system 104 and/or for which the operations computing system 104 is configured, as described herein, the operations for vehicle control and allocation for the provision of vehicle services (e.g., one or more portions of method 900), the operations and functions of any of the models described herein and/or for which the models are configured and/or any other operations and functions for the operations computing system 104, as described herein.

The memory 1120 can store data 1130 that can be obtained (e.g., received, accessed, written, manipulated, generated, created, stored, etc.). The data 1130 can include, for instance, sensor data 116, map data 122, state data 130, prediction data 132, motion planning data 134, data associated with one or more user(s) (user preferences, etc.), data associated with one or more service assignments(s) (start location, end location, convenience factors, etc.), data associated with one or more autonomous vehicles (e.g., autonomous vehicle operational capabilities, vehicle location, etc.) and/or other data/information described herein. In some implementations, the computing device(s) 1110 can obtain data from one or more memories that are remote from the vehicle computing system 1105.

The computing device(s) 1110 can also include a communication interface 1135 used to communicate with one or more other system(s) (e.g., other systems onboard and/or remote from a vehicle, the other systems of FIG. 11, etc.). The communication interface 1135 can include any circuits, components, software, etc. for communicating via one or more network(s) (e.g., 1145). In some implementations, the communication interface 1135 can include, for example, one or more of a communications controller, receiver, transceiver, transmitter, port, conductors, software and/or hardware for communicating data/information.

The remote computing system 1150 can include one or more computing device(s) 1155. The computing device(s) 1155 can include one or more processor(s) 1160 and at least one memory 1165. The one or more processor(s) 1160 can be any suitable processing device (e.g., a processor core, a microprocessor, an ASIC, a FPGA, a controller, a microcontroller, etc.) and can be one processor or a plurality of processors that are operatively connected. The memory 1165 can include one or more tangible, non-transitory computer-readable storage media, such as RAM, ROM, EEPROM, EPROM, one or more memory devices, flash memory devices, data registers, etc., and combinations thereof.

The memory 1165 can store information that can be accessed by the one or more processor(s) 1160. For instance, the memory 1165 (e.g., one or more tangible, non-transitory computer-readable storage media, one or more memory devices, etc.) can include computer-readable instructions 1170 that can be executed by the one or more processor(s) 1160. The instructions 1170 can be software written in any suitable programming language or can be implemented in hardware. Additionally, or alternatively, the instructions 1170 can be executed in logically and/or virtually separate threads on processor(s) 1160.

For example, the memory 1165 can store instructions 1170 that when executed by the one or more processor(s) 1160 cause the one or more processor(s) 1160 to perform operations such as any of the operations and functions of the vehicle computing system 1105, the remote computing system 1150 and/or computing device(s) 1155, or for which any of these computing systems are configured, as described herein, one or more portions of the method 900 as further described herein, operations and functions of the operations computing system 104, and/or any other operations and functions described herein.

The memory 1165 can store data 1175 that can be obtained and/or stored. The data 1175 can include, for instance, services data (e.g., vehicle service data, convenience factors, route data, user data, infrastructure system requirement data, etc.), data associated with autonomous vehicles (e.g., vehicle data, maintenance data, ownership data, sensor data 116, map data 122, prediction data 132, motion planning data 134, object states and/or state data 130, object motion trajectories, feedback data, log data, etc.), data associated with one or more autonomous vehicles (e.g., autonomous vehicle capabilities, vehicle location, etc.) and/or other data/information as described herein. In some implementations, the computing device(s) 1155 can obtain data from one or more memories that are remote from the remote computing system 1150.

The computing device(s) 1155 can also include a communication interface 1180 used to communicate with one or more other system(s) (e.g., the vehicle computing system 1105, etc.). The communication interface 1180 can include any circuits, components, software, etc. for communicating via one or more networks (e.g., network(s) 1145). In some implementations, the communication interface 1180 can include, for example, one or more of a communications controller, receiver, transceiver, transmitter, port, conductors, software, and/or hardware for communicating data.

The network(s) 1145 can be any type of network or combination of networks that allows for communication between devices. In some embodiments, the network(s) 1145 can include one or more of a local area network, wide area network, the Internet, secure network, cellular network, mesh network, peer-to-peer communication link and/or some combination thereof and can include any number of wired or wireless links. Communication over the network(s) 1145 can be accomplished, for instance, via a network interface using any type of protocol, protection scheme, encoding, format, packaging, etc.

Computing tasks discussed herein as being performed at computing device(s) remote from an autonomous vehicle can instead be performed at the vehicle (e.g., via the vehicle computing system 1100), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for multi-autonomous vehicle servicing, the method comprising:
   receiving, by a computing system comprising one or more computing devices, a service request for a vehicle service, wherein the service request comprises a start location and an end location;
   determining, by the computing system, a vehicle route from the start location to the end location;
   identifying, by the computing system, a plurality of candidate vehicles from a plurality of autonomous vehicles, wherein each candidate vehicle in the plurality of candidate vehicles is available to perform at least one portion of the vehicle route;
   obtaining, by the computing system, capability data indicative of one or more operational capabilities for each candidate vehicle in the plurality of autonomous vehicles;
   determining, using the capability data, that the vehicle route is to be executed using more than one of the plurality of candidate vehicles;
   segmenting, by the computing system, the vehicle route into a plurality of route segments based, at least in part, on the capability data;
   assigning, by the computing system, a first route segment of the plurality of route segments to a first candidate vehicle of the plurality of candidate vehicles and a second route segment of the plurality of route segments to a second candidate vehicle of the plurality of candidate vehicles; and
   communicating, by the computing system, data indicative of the first candidate vehicle and the second candidate vehicle.

2. The computer-implemented method of claim 1, further comprising:
   determining, by the computing system, one or more transfer locations for the vehicle route using the capability data; and
   segmenting, by the computing system, the vehicle route into the plurality of route segments based, at least in part, on the one or more transfer locations.

3. The computer-implemented method of claim 2, wherein determining the one or more transfer locations for the vehicle route comprises:
   receiving, by the computing system, a plurality of second service requests for a plurality of second vehicle services;
   determining, by the computing system, a common transfer location for the vehicle route based, at least in part, on the plurality of second service requests;
   wherein segmenting the vehicle route into the plurality of route segments comprises: determining, by the computing system, a common route segment associated with each second service request in the plurality of second service requests based, at least in part, on the common transfer location; and
   wherein assigning the first candidate vehicle and the second candidate vehicle to perform the vehicle service comprises: assigning, by the computing system, a common autonomous vehicle to the common route segment.

4. The computer-implemented method of claim 1, wherein each of the plurality of route segments are indicative of at least two legs, further comprising:
   determining, by the computing system, that the first candidate vehicle is capable of servicing the at least two legs of the first route segment based, at least in part, on a first set of operational capabilities associated with the first candidate vehicle; and
determining, by the computing system, that the second candidate vehicle is capable of servicing the at least two legs of the second route segment based, at least in part, on a second set of operational capabilities associated with the second candidate vehicle.

5. The computer-implemented method of claim 1, wherein the first candidate vehicle is included in a first fleet of autonomous vehicles of a first vehicle provider and the second candidate vehicle is included in a second fleet of autonomous vehicles of a second vehicle provider, wherein the first fleet of autonomous vehicles is different than the second fleet of autonomous vehicles.

6. The computer-implemented method of claim 1, further comprising:
communicating, by the computing system, data indicative of the first route segment for the first candidate vehicle; and
communicating, by the computing system, data indicative of the second route segment for the second candidate vehicle.

7. The computer-implemented method of claim 1, wherein the one or more operational capabilities for each candidate vehicle comprise at least one of: a driving capability or an area permission.

8. The computer-implemented method of claim 7, wherein:
the driving capability for an autonomous vehicle indicates one or more restricted driving maneuvers the autonomous vehicle is unable to perform or one or more autonomous driving maneuvers the autonomous vehicle is able to perform; and
the area permission indicates one or more geographic areas in which the autonomous vehicle is permitted to travel.

9. The computer-implemented method of claim 1, further comprising:
providing, by the computing system, data indicative of the vehicle route, a number of vehicles for the vehicle route, and/or the plurality of route segments of the vehicle route to a user.

10. A computer-implemented method for multi-autonomous vehicle servicing, the method comprising:
receiving, by a computing system comprising one or more computing devices, a service request for a vehicle service, wherein the service request comprises a start location and an end location;
determining, by the computing system, a vehicle route from the start location to the end location;
determining, by the computing system, a plurality of candidate vehicles from a plurality of vehicles, wherein each candidate vehicle in the plurality of candidate vehicles is available to perform at least one portion of the vehicle route;
obtaining, by the computing system, capability data indicative of one or more operational capabilities of the plurality of candidate vehicles;
determining, using the capability data, that the vehicle route is to be executed using more than one of the plurality of candidate vehicles;
segmenting, by the computing system, the vehicle route into a plurality of route segments based, at least in part, on the capability data;
assigning, by the computing system, a first route segment of the plurality of route segments to a first candidate vehicle of the plurality of candidate vehicles and a second route segment of the plurality of route segments to a second candidate vehicle of the plurality of candidate vehicles; and
communicating, by the computing system, data indicative of the service request to first candidate vehicle and the second candidate vehicle.

11. The computer-implemented method of claim 10, wherein the plurality of route segments are also based, at least in part, on one or more convenience factors associated with the service request.

12. The computer-implemented method of claim 11, further comprising:
determining, by the computing system, one or more transfer locations for the vehicle route based, at least in part, on the capability data; and
segmenting, by the computing system, the vehicle route into the plurality of route segments based, at least in part, on the one or more transfer locations.

13. The computer-implemented method of claim 11, wherein the one or more convenience factors associated with the service request comprise one or more of a price, a number of transfer locations, and a time.

14. The computer-implemented method of claim 11, further comprising:
determining, by the computing system, one or more ancillary vehicle routes based on the vehicle route, a number of vehicles assigned for the service request, and the one or more convenience factors associated with the service request, wherein each of the one or more ancillary vehicle routes are associated with a different number of vehicles.

15. The computer-implemented method of claim 14, further comprising:
in response to receiving the service request for a vehicle service for a user, providing, by the computing system, data indicative of the vehicle route and the one or more ancillary vehicle routes to the user.

16. A computing system comprising:
one or more processors; and
one or more tangible, non-transitory, computer readable media that collectively store instructions that when executed by the one or more processors cause the computing system to perform operations, the operations comprising:
receiving a service request for a vehicle service, wherein the service request comprises a start location and an end location;
determining vehicle route from the start location to the end location;
identifying a plurality of candidate vehicles from a plurality of autonomous vehicles, wherein each candidate vehicle in the plurality of candidate vehicles is available to perform at least one portion of the vehicle route;
obtaining, by the computing system, capability data indicative of one or more operational capabilities for each candidate vehicle in the plurality of autonomous vehicles;
determining, using the capability data, that the vehicle route is to be executed using more than one of the plurality of candidate vehicles;
segmenting the vehicle route into a plurality of route segments based, at least in part, on the capability data;
assigning a first route segment of the plurality of route segments to a first candidate vehicle of the plurality of candidate vehicles and a second route segment of the plurality of route segments to a second candidate vehicle of the plurality of candidate vehicles; and communicating data indicative of the service request to the first candidate vehicle and the second candidate vehicle.

17. The computing system of claim 16, wherein each autonomous vehicle in the plurality of autonomous vehicles is a third party autonomous vehicle.

18. The computing system of claim 17, wherein the first candidate vehicle is included in a first autonomous vehicle fleet of a first vehicle provider and the second candidate vehicle is included in a second autonomous vehicle fleet of a second vehicle provider.

19. The computing system of claim 18, wherein the first autonomous vehicle fleet is associated with a first set of operational capabilities, and wherein the second autonomous vehicle fleet is associated with a second set of operational capabilities, and wherein at least a subset of the first set of operational capabilities is different than at least a subset of the second set of operational capabilities.

* * * * *